United States Patent
Berg et al.

(10) Patent No.: US 10,757,607 B2
(45) Date of Patent: Aug. 25, 2020

(54) APPARATUS AND METHOD OF CONTROLLING UTILIZATION OF A FRONTHAUL LINK IN A WIRELESS COMMUNICATION NETWORK

(71) Applicant: Telefonaktiebolaget LM Ericsson (publ), Stockholm (SE)

(72) Inventors: Miguel Berg, Stockholm (SE); Daniel Cederholm, Stockholm (SE); Chenguang Lu, Stockholm (SE); Elmar Trojer, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 47 days.

(21) Appl. No.: 16/081,531

(22) PCT Filed: Mar. 10, 2016

(86) PCT No.: PCT/EP2016/055149
§ 371 (c)(1),
(2) Date: Aug. 31, 2018

(87) PCT Pub. No.: WO2017/152982
PCT Pub. Date: Sep. 14, 2017

(65) Prior Publication Data
US 2019/0281501 A1  Sep. 12, 2019

(51) Int. Cl.
*H04W 4/00* (2018.01)
*H04W 28/22* (2009.01)
(Continued)

(52) U.S. Cl.
CPC ............ *H04W 28/22* (2013.01); *H04L 1/00* (2013.01); *H04L 1/0002* (2013.01);
(Continued)

(58) Field of Classification Search
None
See application file for complete search history.

(56) References Cited

U.S. PATENT DOCUMENTS 9,125,047 B2 *  9/2015  Sundaresan ........... H04W 16/02
9,814,044 B1 * 11/2017  Sevindik ............... H04W 16/04
(Continued)

FOREIGN PATENT DOCUMENTS

| WO | 2014167066 A1 | 10/2014 |
| WO | 2015044871 A1 | 4/2015 |
| WO | 2015197104 A1 | 12/2015 |

OTHER PUBLICATIONS

Ericsson Ab, et al., "Common Public Radio Interface (CPRI); Interface Specification", CPRI Specification V6.0, Aug. 30, 2013, pp. 1-128, CPRI.
(Continued)

*Primary Examiner* — Bob A Phunkulh
(74) *Attorney, Agent, or Firm* — Sage Patent Group

(57) ABSTRACT

A method (10) of controlling utilization of a fronthaul link in a wireless communication network, the fronthaul link being configured to transport a time-domain sample representation of a carrier having a traffic load, the time-domain sample representation of the carrier being generated at a bit rate. The method comprising: obtaining (12) an indication of a traffic load of the carrier; determining (14) a new bit rate for the time-domain sample representation of the carrier, the new bit rate being dependent on the indication of the traffic load of the carrier; and generating (16) a control signal configured to cause the time-domain sample representation of the carrier to be generated at the new bit rate.

18 Claims, 11 Drawing Sheets

(51) Int. Cl.
  *H04W 28/02* (2009.01)
  *H04W 28/08* (2009.01)
  *H04L 1/00* (2006.01)
  *H04W 92/12* (2009.01)
  *H04W 88/08* (2009.01)
  *H04W 88/18* (2009.01)

(52) U.S. Cl.
  CPC ....... *H04L 1/0015* (2013.01); *H04W 28/0268* (2013.01); *H04W 28/0289* (2013.01); *H04W 28/08* (2013.01); *H04L 1/0025* (2013.01); *H04W 88/085* (2013.01); *H04W 88/181* (2013.01); *H04W 92/12* (2013.01)

(56) References Cited

U.S. PATENT DOCUMENTS

| | | | | |
|---|---|---|---|---|
| 2008/0186858 | A1* | 8/2008 | Jalil | H04W 28/10 370/235 |
| 2009/0290632 | A1* | 11/2009 | Wegener | H03M 7/30 375/240 |
| 2012/0176966 | A1* | 7/2012 | Ling | H04B 1/40 370/328 |
| 2012/0250740 | A1* | 10/2012 | Ling | H04W 88/085 375/219 |
| 2012/0307770 | A1* | 12/2012 | Kubota | H04W 28/0205 370/329 |
| 2014/0031049 | A1 | 1/2014 | Sundersan et al. | |
| 2014/0213256 | A1* | 7/2014 | Meylan | H04W 48/18 455/436 |
| 2014/0313914 | A1 | 10/2014 | Ling | |
| 2015/0117277 | A1* | 4/2015 | Liu | H04L 1/00 370/280 |
| 2015/0270882 | A1* | 9/2015 | Shattil | H04B 1/0003 370/329 |
| 2016/0088522 | A1* | 3/2016 | Lu | H04W 28/20 |
| 2016/0183248 | A1* | 6/2016 | Niu | H04B 7/0413 370/329 |
| 2017/0055175 | A1* | 2/2017 | Leroux | H04W 28/0231 |
| 2017/0079059 | A1* | 3/2017 | Li | H04W 16/02 |
| 2017/0150497 | A1* | 5/2017 | Boldi | H04L 5/0007 |
| 2017/0164236 | A1* | 6/2017 | Boldi | H04B 10/25758 |
| 2017/0164336 | A1* | 6/2017 | Boldi | H04W 72/0433 |
| 2017/0171088 | A1* | 6/2017 | Shor | H04L 47/30 |
| 2017/0238361 | A1* | 8/2017 | Pawar | H03M 7/40 455/561 |
| 2017/0257155 | A1* | 9/2017 | Liang | H04B 17/336 |

OTHER PUBLICATIONS

The Telecommunication Technology Committee, "TTC Ad Hoc Group on Future Mobile Networking White Paper", Version 1.0, Mar. 20, 2015, pp. 1-86.
Lorca, J., et al., "Lossless Compression Technique for the Fronthaul of LTE/LTE-Advanced Cloud-RAN Architectures", 2013 IEEE 14th International Symposium on "A World of Wireless, Mobile and Multimedia Networks" (WoWMoM), Jun. 4, 2013, pp. 1-9, IEEE.
First Examination Report dated Jun. 24, 2020 for Indian Patent Application No. 201817030742, 6 pages.

\* cited by examiner

APPARATUS AND METHOD OF CONTROLLING UTILIZATION OF A FRONTHAUL LINK IN A WIRELESS COMMUNICATION NETWORK

TECHNICAL FIELD

The invention relates to a method of controlling utilization of a fronthaul link in a wireless communication network. The invention further relates to a controller for a fronthaul link in a wireless communication network and a wireless communication network node for connection to a fronthaul link in a wireless communication network.

BACKGROUND

Fronthaul technologies, connecting remote radio units, RRU, or radio heads, RH, to base-band units, BBUs, have recently received a lot of attention in the telecom industry. The benefits of a C-RAN, centralized radio access network or cloud RAN, architecture can only be realized with fronthaul connecting distributed RRUs or RHs to centralized BBUs.

In fronthaul like the common public radio interface, CPRI, the radio signal is currently transported in the form of baseband IQ samples. In uplink at the RH, the received RF signal is down-converted and digitized in order to get baseband IQ samples. These samples are then processed further in the BBU. In downlink at the RH, the received baseband IQ samples from the fronthaul interface are converted to the desired RF signal by up-conversion and digital-to-analog conversion. The RF signal is then amplified and transmitted from the antenna.

Each IQ sample is quantized to a high number of bits, e.g. 20-30 bits in a floating- or fixed-point format, to keep the radio signal quality within standardized levels.

The current CPRI standard, version 6.0, specifies the fronthaul interface implementation. CPRI was originally designed as an internal interface between baseband and radio cards within a base station. It has now also come to been used in point-to-point fronthaul links between BBUs and RRUs for main-remote applications. CPRI specifies a multiplexing protocol to transmit the IQ samples of multiple antenna-carriers and the corresponding control/management messages together at a constant bit rate. It also provides a synchronization mechanism to synchronize the timing at the RRU side.

A major issue in current fronthaul implementations is the high bit rate requirements. For a single antenna, having for example a 20 MHz carrier bandwidth, 30.72 MHz sampling rate and 15+15 quantization bits per IQ sample, the required fronthaul capacity is about 922 Mbps although the traffic peak-rate is only 75 Mbps, for 64-QAM, quadrature amplitude modulation. Hence, a fronthaul link has to carry more than 12 times the actual air-interface traffic rate. Given a C-RAN architecture with a high number of RRUs connecting back to several BBUs, the high capacity demand for CPRI constitutes a scalability problem on the fronthaul links; they are developing bottlenecks.

To mitigate this, fronthaul compression schemes have been proposed utilizing inherent redundancy in the stream of IQ samples; the data rate can be reduced by lossy compression, trading radio signal quality for bit rate. Compression rates of 80% have been reported. The compressed fronthaul data is usually carried by a constant bit rate transmission like CPRI. Also, new Ethernet-based approaches have been proposed which carry the fronthaul data by Ethernet frames.

US 2014/0313914 A1 describes coordinated access and backhaul networks in which signalling parameters of the radio link are adjusted in response to degradations or improvements in the backhaul link, to try to maintain constant quality of the radio link as backhaul performance varies. It proposes decreasing the number of bits per sample for CPRI data transmitted over a microwave link that experiences degradation, or to change sample rate and/or resolution for a sampled analogue radio signal from a remote radio head.

WO2014167066 A1 discloses a mobile communication network and method for operating a mobile communication network in which backhaul capacity is determined and then radio capabilities of one or more base stations are adapted, preferably by the corresponding base station itself.

SUMMARY

It is an object to provide an improved method of controlling utilization of a fronthaul link in a wireless communication network. It is a further object to provide an improved controller for a fronthaul link in a wireless communication network. It is a further object to provide an improved wireless communication network node for connection to a fronthaul link in a wireless communication network.

An aspect of the invention provides a method of controlling utilization of a fronthaul link in a wireless communication network. The fronthaul link is configured to transport a time-domain sample representation of a carrier having a traffic load. The time-domain sample representation of the carrier is generated at a bit rate. The method comprises obtaining an indication of a traffic load of the carrier. The method comprises determining a new bit rate for the time-domain sample representation of the carrier, the new bit rate being dependent on the indication of the traffic load of the carrier. The method comprises generating a control signal configured to cause the time-domain sample representation of the carrier to be generated at the new bit rate.

The method addresses the problems of the current load-independent fronthaul bit rate, or bandwidth, by adapting the bit rate according to the traffic load of the carrier represented by the time-domain sample representation, while the air performance may be maintained at the levels achieved by conventional CPRI fronthaul. Adapting the fronthaul bit rate used for a time-domain sample representation of carrier to the actual traffic load of the carrier may enable more carriers to be carried on a fronthaul link. It may also significantly reduce overall fronthaul capacity required and thereby reduce costs. The method may enable statistical multiplexing in fronthaul, which may enable more carriers to be loaded onto a fronthaul link for a given fixed fronthaul link capacity.

In US 2014/0313914 A1 the adaptation of the number of bits per sample is not according to the traffic load. The method of the present invention may enable bit rate adaption that follow traffic load changes to increase network efficiency.

In an embodiment, determining the new bit rate comprises comparing the indication of the traffic load to a preselected threshold value. If the indication of the traffic load is lower than the preselected threshold value the new bit rate is obtained by decreasing the bit rate. Decreasing the bit rate when the traffic load of the carrier goes lower than a preselected threshold may enable more carriers to be carried on a fronthaul link for a given fixed fronthaul link capacity.

In an embodiment, determining the new bit rate comprises comparing the indication of the traffic load to a preselected threshold value. If the indication of the traffic load is higher than the preselected threshold value the new bit rate is obtained by increasing the bit rate. Increasing the bit rate when the traffic load of the carrier goes higher than a preselected threshold may ensure that the full traffic capacity of the carrier can be utilized, i.e. that the maximum achievable traffic rate is not capped.

In an embodiment, the indication of the traffic load is compared to a first preselected threshold value to determine whether to obtain the new bit rate by decreasing the bit rate and the indication of the traffic load is compared to a second preselected threshold value, different to the first preselected threshold value, to determine whether to obtain the new bit rate by increasing the bit rate.

In an embodiment, the second preselected threshold value is higher than the first preselected threshold value.

In an embodiment, if the bit rate was obtained by decreasing a previous bit rate, if a preselected time period has elapsed since said previous decrease, and if the indication of the traffic load is less than an indication of a maximum traffic load of the carrier, the new bit rate is obtained by increasing the bit rate. It may sometimes be difficult to determine whether the required bit rate is higher than the bit rate currently allowed by the fronthaul link. Using a time-based approach to increasing the bit rate may ensure that the bit rate does not remain lower than it should be.

In an embodiment, the bit rate is increased incrementally by a preselected step size until the traffic load is higher than the preselected threshold value. This may ensure that large variations in the bit rate are not produced and that the full traffic capacity of the carrier can be utilized In some cases, the first and second preselected thresholds, for decreasing and increasing the bit rate, may be close to each other, which could result in very frequent changes of bit rate. This may not be desired, due to the additional overhead needed to inform the other end of the fronthaul link of the changes. Using a time-based approach to increasing the bit rate may prevent the bit rate changing too frequently.

In an embodiment, the preselected threshold value is a preselected amount below an indication of a maximum traffic load of the carrier. The threshold value may be very different for different traffic capacities. Setting the preselected threshold value relative to the maximum traffic load may ensure that the threshold is always related to the traffic capacity.

In an embodiment, the bit rate is decreased or increased by respectively decreasing or increasing a number of quantization bits of the time-domain sample representation of the carrier. The bit rate is determined from the sampling rate and the number of quantization bits used to represent each sample of the time-domain sample representation of the carrier. Changing the number of quantization bits therefore changes the bit rate.

In an embodiment, the bit rate is decreased or increased by respectively decreasing or increasing a sampling rate of the time-domain sample representation of the carrier.

The bit rate is determined from the sampling rate and the number of quantization bits used to represent each sample of the time-domain sample representation of the carrier. Changing the number of quantization bits or the sampling rate therefore changes the bit rate.

In an embodiment, the method further comprises reducing a bandwidth of the carrier. This may enable a lower sampling rate to be used.

In an embodiment, the carrier comprises a plurality of subcarriers and the bandwidth of the carrier is reduced by suppressing some of the subcarriers. The sampling rate is reduced to less than an original Nyquist sampling rate of the time-domain sample representation of the carrier. The original Nyquist sampling rate is the sampling rate of the time-domain sample representation of the carrier before bandwidth reduction of the carrier by suppressing some of the subcarriers. Reducing the signal bandwidth by filtering out subcarriers outside the reduced bandwidth, when traffic load is low, enables the filtered carrier to be sampled at a lower sampling rate. This will force traffic to be loaded only onto the unfiltered subcarriers in the remaining bandwidth.

In an embodiment, determining the new bit rate comprises retrieving a respective preselected bit rate corresponding to the indication of the traffic load. The new bit rate may be retrieved from a look-up table.

In an embodiment, the indication of the traffic load comprises at least one of a power of the carrier, an air-interface bit rate of the carrier, an estimate of occupied resources in a time-frequency grid of the carrier, and an indication of a required quality of resource elements of the carrier. The indication of the traffic load may be obtained through explicit communication from a baseband unit connected to the fronthaul link or by analysis of the time-domain sample representation of the carrier. The power of the carrier, in for example Watts or Milliwatts, is proportional to the current utilization of the time-frequency grid. Thus, 50% of the maximum power means 50% utilization. Use of the power of the carrier as the indication of the traffic load may be advantageous because calculating signal power is less complicated than any type of spectral analysis.

In an embodiment, the power of the carrier is an average power of the carrier. A simple but effective method is to utilize average power detection as the indication of the traffic load of the carrier since there is a correlation between carrier power and the number of occupied resource blocks, in for example LTE.

In an embodiment, the power of the carrier is an average power of the carrier over at least one subframe of the carrier. The method may be applied to LTE, long term evolution, carriers.

In an embodiment, when the indication of the traffic load comprises an estimate of an average fraction of occupied resources in a time-frequency grid of the carrier indicating that a full bandwidth of the carrier is not used, the bit rate is decreased by decreasing a sampling rate of the time-domain sample representation of the carrier. The sampling rate is maintained above the original Nyquist sampling rate of the time-domain sample representation of the carrier. Decreasing the sampling rate under these circumstances may ensure that any signal quality loss for a given bit rate reduction is smaller than may be achieved by reducing the number of quantization bits, as described above, as long as the sampling rate is above critical sampling, Nyquist.

In an embodiment, the sampling rate may be temporarily reduced to below the original Nyquist sampling rate. Temporary use of a sampling rate below the original Nyquist critical sampling rate may be acceptable if there are gaps in the time-frequency grid of the carrier since some radio access technologies may be able to adapt and compact the time-frequency grid until the sampling rate reaches or exceeds the original Nyquist sampling rate.

In an embodiment, when the indication of the traffic load comprises an estimate of an average fraction of occupied resources in a time-frequency grid of the carrier indicating that all of the resources in the time-frequency grid are occupied, the bit rate is decreased by decreasing a number of quantization bits of the time-domain sample representation of the carrier. If all resources in the time-frequency grid are occupied and the sampling rate is reduced below the original Nyquist sampling rate, the air interface performance is likely to be degraded. However, the number of quantization bits may be reduced without penalizing the air interface.

The maximum traffic load is reached when the time-frequency grid is filled with the highest modulation format. A lower traffic load can result either from the time-frequency grid not being filled, i.e. has unused resource blocks, or that the time-frequency grid is filled but not with the highest modulation format, for example because the SNR is too low.

In an embodiment, when the indication of the traffic load comprises at least one of an air-interface bit rate of the carrier, a target signal-to-noise ratio, SNR, of the carrier, a modulation format of the carrier and a coding format of the carrier, and does not comprise an estimate of occupied resources in a time-frequency grid of the carrier, the bit rate is decreased by decreasing a number of quantization bits of the time-domain sample representation of the carrier. If the indication of the traffic load of the carrier comprises information about the required quality of resource elements, such as target SNR, modulation and coding format, and air-interface bit rate, it is possible to calculate the minimum required number of quantization bits per sample. In this case, re-quantization is preferred and may be applied for carriers that do not have a frequency domain resource grid, such as Wideband Code Division Multiple Access, WCDMA, carriers.

In an embodiment, the indication of the traffic load of the carrier is received from a baseband unit to which the fronthaul link is connected.

In an embodiment, the indication of the traffic load of the carrier is obtained by spectral analysis of the carrier. Spectral analysis of the carrier may comprise performing a fast Fourier transform, FFT, of the carrier.

In an embodiment, when the indication of the traffic load comprises a power of the carrier, the preselected threshold is a preselected amount below the power of the carrier at the maximum traffic load of the carrier. The threshold value may be very different for different traffic capacities. Setting the preselected threshold value relative to the maximum traffic load may ensure that the threshold is always related to the traffic capacity.

In an embodiment, when the method comprises reducing a bandwidth of the carrier, the preselected threshold is a preselected amount below a compensated power of the carrier at the maximum traffic load of the carrier. The compensated power is the power of the carrier at the maximum traffic load of the carrier reduced by an amount dependent on the reduced bandwidth of the carrier. Here the preselected threshold is not relative to the total maximum power since reducing the bandwidth by filtering the carrier will affect how much power the carrier may have. Instead the threshold is relative to the maximum power compensated with how much power the filter reduces.

In an embodiment, the fronthaul link is configured to transport respective time-domain sample representations of a plurality of carriers each having a respective traffic load, each time-domain sample representation being generated at a respective bit rate. The method comprises obtaining a respective indication of a respective traffic load of each of said plurality of carriers. The method comprises determining a respective new bit rate for each time-domain sample representation. Each respective new bit rate is dependent on the respective indication of the respective traffic load of the respective carrier. The method comprises generating at least one control signal configured to cause the respective time-domain sample representation of each carrier to be generated at the respective new bit rate. Wherein if a sum of the new bit rates for the respective time-domain sample representations of said plurality of carriers exceeds a capacity of the fronthaul link, a respective share of the capacity is allocated to each said carrier according to at least one of a priority-based capacity sharing scheme and a fairness model based capacity sharing scheme. The respective new bit rate for the respective time-domain sample representation of at least some of said plurality of carriers is additionally dependent on the respective allocated share of the capacity.

This may enable fronthaul infrastructure sharing and a significant reduction of deployment cost per network operator. This would be especially useful in the indoor market where a neutral-host environment is crucial for cost-efficiency. This may enable multiple network operators to share fronthaul links, avoiding the need to deploy parallel fronthaul networks for each operator.

In an embodiment, the method further comprises applying a respective bias to at least one of the traffic load indication and the preselected threshold value for at least some of the plurality of carriers. This may ensure that each said carrier remains within its respective allocated share of the capacity. For example, if a carrier exceeds its allocated share of the capacity, the preselected threshold value for a bit rate decrease can be set to a level above the indication of the traffic load of the carrier in order to force a bit rate decrease.

In an embodiment, the fairness model is one of a maximum-minimum fairness model and a proportional fairness model. Fairness models will be well known to the skilled person for use in congestion control in communication networks.

In an embodiment, the priority-based capacity sharing scheme may comprise assigning different priorities to the plurality of carriers. The priorities may be assigned according to a service level agreement. The priorities may be strict so that high priorities always have precedence over low priorities, or the priorities may take the form of weights so that a high priority gets a larger fraction of the capacity of the fronthaul link.

Applying a fair scheduling scheme between network operators, each network operator may still be able to provide a peak rate to their users in time, when the traffic load on its carrier is high while traffic load on other carriers is low, while sharing one fronthaul link with other network operators.

In an embodiment, the time-domain sample representation of a carrier comprises IQ data samples and the bit rate is an IQ-sample bit rate. The method addresses the problems of the current load-independent fronthaul bit rate, or bandwidth, by adapting the IQ-sample bit rate according to the traffic load of the carrier represented by the IQ samples, while the air performance may be maintained at the levels achieved by conventional CPRI fronthaul. Adapting the fronthaul bit rate used for a time-domain sample representation of carrier to the actual traffic load of the carrier may enable more carriers to be carried on a fronthaul link. The compressed IQ samples can either be transmitted using variable bit rate, in packets, or many compressed antenna carriers can be aggregated in a constant bit rate transmission.

Another aspect of the invention provides a controller for a fronthaul link in a wireless communication network. The fronthaul link is configured to transport a time-domain sample representation of a carrier having a traffic load. The time-domain sample representation of the carrier is generated at a sample bit rate. The controller comprises a processor and a memory containing instructions executable by the processor, whereby the controller is operative to: obtain an indication of a traffic load of the carrier; determine a new bit rate for the time-domain sample representation of the carrier, the new bit rate being dependent on the indication of the traffic load of the carrier; and generate a control signal configured to cause the time-domain sample representation of the carrier to be generated at the new bit rate.

The controller addresses the problems of the current load-independent fronthaul bit rate, or bandwidth, by adapting the bit rate according to the traffic load of the carrier represented by the time-domain sample representation, while the air performance may be maintained at the levels achieved by conventional CPRI fronthaul. Adapting the fronthaul bit rate used for a time-domain sample representation of a carrier to the actual traffic load of the carrier may enable more carriers to be carried on a fronthaul link. It may also significantly reduce overall fronthaul capacity required and thereby reduce costs. The controller may enable statistical multiplexing in fronthaul, which may enable more carriers to be loaded onto a fronthaul link for a given fixed fronthaul link capacity.

In US 2014/0313914 A1 the adaptation of the number of bits per sample is not according to the traffic load. The controller of the present invention may enable bit rate adaption that follow traffic load changes to increase network efficiency.

In an embodiment, the controller is operative to determine the new bit rate by comparing the indication of the traffic load to a preselected threshold value. If the indication of the traffic load is lower than the preselected threshold value the new bit rate is obtained by decreasing the bit rate. Decreasing the bit rate when the traffic load of the carrier goes lower than a preselected threshold may enable more carriers to be carried on a fronthaul link for a given fixed fronthaul link capacity.

In an embodiment, the controller is operative to determine the new bit rate by comparing the indication of the traffic load to a preselected threshold value. If the indication of the traffic load is higher than the preselected threshold value the new bit rate is obtained by increasing the bit rate. Increasing the bit rate when the traffic load of the carrier goes higher than a preselected threshold may ensure that the full traffic capacity of the carrier can be utilized, i.e. that the maximum achievable traffic rate is not capped.

In an embodiment, the controller is operative to compare the indication of the traffic load to a first preselected threshold value to determine whether to obtain the new bit rate by decreasing the bit rate and to compare the indication of the traffic load to a second preselected threshold value, different to the first preselected threshold value, to determine whether to obtain the new bit rate by increasing the bit rate.

In an embodiment, the second preselected threshold value is higher than the first preselected threshold value.

In an embodiment, the controller is operative to, if the bit rate was obtained by decreasing a previous bit rate, if a preselected time period has elapsed since said previous decrease, and if the indication of the traffic load is less than an indication of a maximum traffic load of the carrier, obtain the new bit rate by increasing the bit rate. It may sometimes be difficult to determine whether the required bit rate is higher than the bit rate currently allowed by the fronthaul link. Using a time-based approach to increasing the bit rate may ensure that the bit rate does not remain lower than it should be.

In an embodiment, the controller is operative to incrementally increase the bit rate by a preselected step size until the traffic load is higher than the preselected threshold value. This may ensure that large variations in the bit rate are not produced and that the full traffic capacity of the carrier can be utilized In some cases, the first and second preselected thresholds, for decreasing and increasing the bit rate, may be close to each other, which could result in very frequent changes of bit rate. This may not be desired, due to the additional overhead needed to inform the other end of the fronthaul link of the changes. Using a time-based approach to increasing the bit rate may prevent the bit rate changing too frequently.

In an embodiment, the preselected threshold value is a preselected amount below an indication of a maximum traffic load of the carrier. The threshold value may be very different for different traffic capacities. Setting the preselected threshold value relative to the maximum traffic load may ensure that the threshold is always related to the traffic capacity.

In an embodiment, the controller is operative to decrease or increase the bit rate by respectively decreasing or increasing a number of quantization bits of the time-domain sample representation of the carrier. The bit rate is determined from the sampling rate and the number of quantization bits used to represent each sample of the time-domain sample representation of the carrier. Changing the number of quantization bits therefore changes the bit rate.

In an embodiment, the controller is operative to decrease or increase the bit rate by respectively decreasing or increasing a sampling rate of the time-domain sample representation of the carrier.

The bit rate is determined from the sampling rate and the number of quantization bits used to represent each sample of the time-domain sample representation of the carrier. Changing the number of quantization bits or the sampling rate therefore changes the bit rate.

In an embodiment, the controller is operative to reduce a bandwidth of the carrier. This may enable a lower sampling rate to be used.

In an embodiment, the carrier comprises a plurality of subcarriers and the controller is operative to reduce the bandwidth of the carrier by suppressing some of the subcarriers. The sampling rate is reduced to less than an original Nyquist sampling rate of the time-domain sample representation of the carrier. The original Nyquist sampling rate is the sampling rate of the time-domain sample representation of the carrier before bandwidth reduction of the carrier by suppressing some of the subcarriers. Reducing the signal bandwidth by filtering out subcarriers outside the reduced bandwidth, when traffic load is low, enables the filtered carrier to be sampled at a lower sampling rate. This will force traffic to be loaded only onto the unfiltered subcarriers in the remaining bandwidth.

In an embodiment, the controller is operative to determine the new bit rate by retrieving a respective preselected bit rate corresponding to the indication of the traffic load. The new bit rate may be retrieved from a look-up table.

In an embodiment, the indication of the traffic load comprises at least one of a power of the carrier, an air-interface bit rate of the carrier, an estimate of occupied resources in a time-frequency grid of the carrier, and an indication of a required quality of resource elements of the carrier. The indication of the traffic load may be obtained by the controller through explicit communication from a baseband unit connected to the fronthaul link or by analysis of the time-domain sample representation of the carrier. The power of the carrier, in for example Watts or milliwatts, is proportional to the current utilization of the time-frequency grid. Thus, 50% of the maximum power means 50% utilization. Use of the power of the carrier as the indication of the traffic load may be advantageous because calculating signal power is less complicated than any type of spectral analysis.

In an embodiment, the power of the carrier is an average power of the carrier. A simple but effective method is to utilize average power detection as the indication of the traffic load of the carrier since there is a correlation between carrier power and the number of occupied resource blocks, in for example LTE.

In an embodiment, the power of the carrier is an average power of the carrier over at least one subframe of the carrier. The method may be applied to LTE, long term evolution, carriers.

In an embodiment, the controller is operative to, when the indication of the traffic load comprises an estimate of an average fraction of occupied resources in a time-frequency grid of the carrier indicating that a full bandwidth of the carrier is not used, decrease the bit rate by decreasing a sampling rate of the time-domain sample representation of the carrier. The sampling rate is maintained above the original Nyquist sampling rate of the time-domain sample representation of the carrier. Decreasing the sampling rate under these circumstances may ensure that any signal quality loss for a given bit rate reduction is smaller than may be achieved by reducing the number of quantization bits, as described above, as long as the sampling rate is above critical sampling, Nyquist.

In an embodiment, the controller is operative to temporarily reduce the sampling rate to below the original Nyquist sampling rate. Temporary use of a sampling rate below the original Nyquist critical sampling rate may be acceptable if there are gaps in the time-frequency grid of the carrier since some radio access technologies may be able to adapt and compact the time-frequency grid until the sampling rate reaches or exceeds the original Nyquist sampling rate.

In an embodiment, the controller is operative to, when the indication of the traffic load comprises an estimate of an average fraction of occupied resources in a time-frequency grid of the carrier indicating that all of the resources in the time-frequency grid are occupied, decrease the bit rate by decreasing a number of quantization bits of the time-domain sample representation of the carrier. If all resources in the time-frequency grid are occupied and the sampling rate is reduced below the original Nyquist sampling rate, the air interface performance is likely to be degraded. However, the number of quantization bits may be reduced without penalizing the air interface.

The maximum traffic load is reached when the time-frequency grid is filled with the highest modulation format. A lower traffic load can result either from the time-frequency grid not being filled, i.e. has unused resource blocks, or that the time-frequency grid is filled but not with the highest modulation format, for example because the SNR is too low.

In an embodiment, the controller is operative to, when the indication of the traffic load comprises at least one of an air-interface bit rate of the carrier, a target signal-to-noise ratio, SNR, of the carrier, a modulation format of the carrier and a coding format of the carrier, and does not comprise an estimate of occupied resources in a time-frequency grid of the carrier, decrease the bit rate by decreasing a number of quantization bits of the time-domain sample representation of the carrier. If the indication of the traffic load of the carrier comprises information about the required quality of resource elements, such as target SNR, modulation and coding format, and air-interface bit rate, it is possible to calculate the minimum required number of quantization bits per sample.

In this case, re-quantization is preferred and may be applied for carriers that do not have a frequency domain resource grid, such as Wideband Code Division Multiple Access, WCDMA, carriers.

In an embodiment, the controller is operative to receive the indication of the traffic load of the carrier from a baseband unit to which the fronthaul link is connected.

In an embodiment, the indication of the traffic load of the carrier is obtained by spectral analysis of the carrier. Spectral analysis of the carrier may comprise performing a fast Fourier transform, FFT, of the carrier.

In an embodiment, when the indication of the traffic load comprises a power of the carrier, the preselected threshold is a preselected amount below the power of the carrier at the maximum traffic load of the carrier. The threshold value may be very different for different traffic capacities. Setting the preselected threshold value relative to the maximum traffic load may ensure that the threshold is always related to the traffic capacity.

In an embodiment, when the controller is operative to reduce a bandwidth of the carrier, the preselected threshold is a preselected amount below a compensated power of the carrier at the maximum traffic load of the carrier. The compensated power is the power of the carrier at the maximum traffic load of the carrier reduced by an amount dependent on the reduced bandwidth of the carrier. Here the preselected threshold is not relative to the total maximum power since reducing the bandwidth by filtering the carrier will affect how much power the carrier may have. Instead the threshold is relative to the maximum power compensated with how much power the filter reduces.

In an embodiment, the fronthaul link is configured to transport respective time-domain sample representations of a plurality of carriers each having a respective traffic load. Each time-domain sample representation is generated at a respective bit rate. The controller is operative to: obtain a respective indication of a respective traffic load of each of said plurality of carriers; determine a respective new bit rate for each time-domain sample representation, each respective new bit rate being dependent on the respective indication of the respective traffic load of the respective carrier; and generate at least one control signal configured to cause the respective time-domain sample representation of each carrier to be generated at the respective new bit rate. Wherein if a sum of the new bit rates for the time-domain sample representations of said plurality of carriers exceeds a capacity of the fronthaul link, the controller is operative to allocate a respective share of the capacity to each said carrier according to at least one of a priority-based capacity sharing scheme and a fairness model based capacity sharing scheme. The controller is operative to determine the respective new bit rate for the respective time-domain sample representation of at least some of said plurality of carriers such that each said respective new bit rate is additionally dependent on the respective allocated share of the capacity.

This may enable fronthaul infrastructure sharing and a significant reduction of deployment cost per network operator. This would be especially useful in the indoor market where a neutral-host environment is crucial for cost-efficiency. This may enable multiple network operators to share fronthaul links, avoiding the need to deploy parallel fronthaul networks for each operator.

In an embodiment, the controller is configured to apply a respective bias to at least one of the traffic load indication and the preselected threshold value for at least some of the plurality of carriers. This may ensure that each said carrier remains within its respective allocated share of the capacity.

For example, if a carrier exceeds its allocated share of the capacity, the preselected threshold value for a bit rate decrease can be set to a level above the indication of the traffic load of the carrier in order to force a bit rate decrease.

In an embodiment, the fairness model is one of a maximum-minimum fairness model and a proportional fairness model. Fairness models will be well known to the skilled person for use in congestion control in communication networks.

In an embodiment, the priority-based capacity sharing scheme may comprise assigning different priorities to the plurality of carriers. The priorities may be assigned according to a service level agreement. The priorities may be strict so that high priorities always have precedence over low priorities, or the priorities may take the form of weights so that a high priority gets a larger fraction of the capacity of the fronthaul link.

Applying a fair scheduling scheme between network operators, each network operator may still be able to provide a peak rate to their users in time, when the traffic load on its carrier is high while traffic load on other carriers is low, while sharing one fronthaul link with other network operators.

In an embodiment, the time-domain sample representation of a carrier comprises IQ data samples and the bit rate is an IQ-sample bit rate. The method addresses the problems of the current load-independent fronthaul bit rate, or bandwidth, by adapting the IQ-sample bit rate according to the traffic load of the carrier represented by the IQ samples, while the air performance may be maintained at the levels achieved by conventional CPRI fronthaul. Adapting the fronthaul bit rate used for a time-domain sample representation of carrier to the actual traffic load of the carrier may enable more carriers to be carried on a fronthaul link. The compressed IQ samples can either be transmitted using variable bit rate, in packets, or many compressed antenna carriers can be aggregated in a constant bit rate transmission.

Corresponding embodiments are also applicable for each of the controllers for a fronthaul link in a wireless communication network and the wireless communication network node for connection to a fronthaul link in a wireless communication network described below.

A controller for a fronthaul link in a wireless communication network, the fronthaul link being configured to transport a time-domain sample representation of a carrier having a traffic load, the time-domain sample representation of the carrier being generated at a sample bit rate. The controller comprising a processor and a memory. The memory containing instructions executable by the processor, whereby the controller is operative to obtain an indication of a traffic load of the carrier. The memory containing further instructions executable by the processor, whereby the controller is further operative to determine a new bit rate for the time-domain sample representation of the carrier, the new bit rate being dependent on the indication of the traffic load of the carrier. The memory containing further instructions executable by the processor, whereby the controller is further operative to generate a control signal configured to cause the time-domain sample representation of the carrier to be generated at the new bit rate.

The controller could be implemented as one or more processors, hardware, processing hardware or circuitry.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

A further aspect of the invention provides a controller for a fronthaul link in a wireless communication network, the fronthaul link being configured to transport a time-domain sample representation of a carrier having a traffic load, the time-domain sample representation of the carrier being generated at a sample bit rate. The controller comprising:

a carrier characteristics module, for obtaining an indication of a traffic load of the carrier;

a bit rate module for determining a new bit rate for the time-domain sample representation of the carrier, the new bit rate being dependent on the indication of the traffic load of the carrier; and a control signal module, for generating a control signal configured to cause the time-domain sample representation of the carrier to be generated at the new bit rate.

The modules in at least one embodiment are implemented as a computer program running on a processor.

A further aspect of the invention provides a wireless communication network node for connection to a fronthaul link in a wireless communication network. The fronthaul link is configured to transport a time-domain sample representation of a carrier having a traffic load. The time-domain sample representation of the carrier is generated at a sample bit rate. The wireless communication network node comprises a controller comprising a processor and a memory containing instructions executable by the processor, whereby the controller is operative to: obtain an indication of a traffic load of the carrier; determine a new bit rate for the time-domain sample representation of the carrier, the new bit rate being dependent on the indication of the traffic load of the carrier; and generate a control signal configured to cause the time-domain sample representation of the carrier to be generated at the new bit rate.

A further aspect of the invention provides a computer program, comprising instructions which, when executed on at least one processor, cause the at least one processor to perform any of the above steps of the method of controlling utilization of a fronthaul link in a wireless communication network.

A carrier containing a computer program, comprising instructions which, when executed on at least one processor, cause the at least one processor to perform any of the above steps of the method of controlling utilization of a fronthaul link in a wireless communication network. The carrier is one of an electronic signal, optical signal, radio signal, or computer readable storage medium.

Embodiments of the invention will now be described, by way of example only, with reference to the accompanying drawings.

DETAILED DESCRIPTION

The same reference numbers will used for corresponding features in different embodiments.

Figure 1:
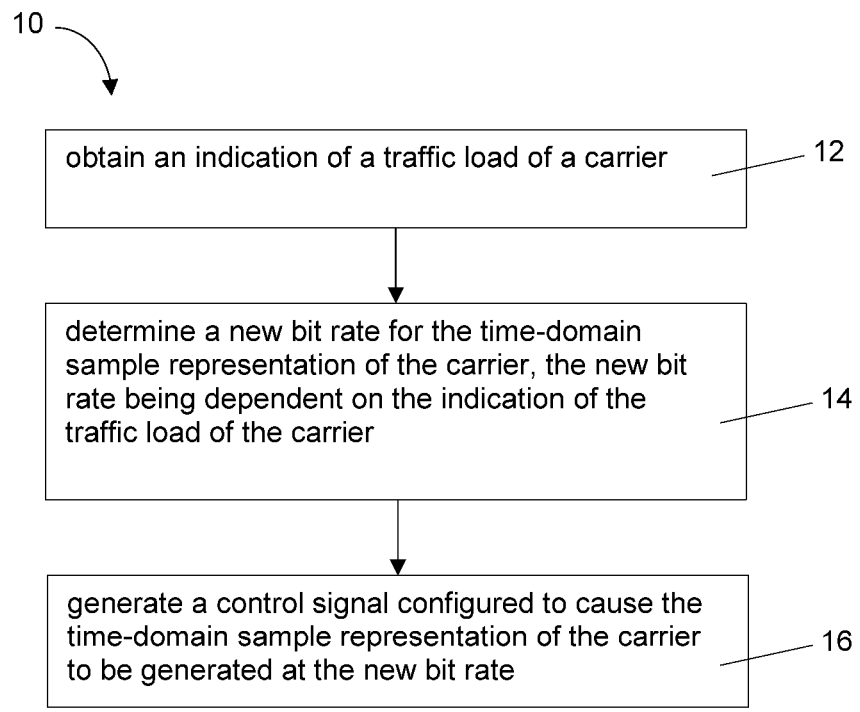
FIG. 1 shows the steps of a method according to an embodiment of the invention of controlling utilization of a fronthaul link in a wireless communication network.

Referring to FIG. 1, an embodiment of the invention provides a method 10 of controlling utilization of a fronthaul link in a wireless communication network. In a communication network the part of the network connecting remote radio units, RRU, or radio heads, RH, to baseband units, BBUs, is known as fronthaul.

The fronthaul link is configured to transport a time-domain sample representation of a carrier having a traffic load. The time-domain sample representation of the carrier is generated at a bit rate.

Traffic load refers to the fraction of occupied air interface resources over frequency and time, for example resource block utilization in an LTE time-frequency grid. The basic LTE downlink physical resource can be seen as a time-frequency grid. Orthogonal frequency division multiplexing, OFDM, symbols are grouped into resource blocks; OFDM is a frequency-division multiplexing scheme used as a digital multi-carrier modulation method. In LTE, the resource blocks have a total size of 180 kHz in the frequency domain and 0.5 ms in the time domain. Each 1 ms Transmission Time Interval, TTI, consists of two slots, Tslot.

The method comprises:
obtaining 12 an indication of a traffic load of the carrier;
determining 14 a new bit rate for the time-domain sample representation of the carrier, the new bit rate being dependent on the indication of the traffic load of the carrier; and
generating 16 a control signal configured to cause the time-domain sample representation of the carrier to be generated at the new bit rate.

Dependent on includes both increasing the bit rate when the indication of the traffic load of the carrier increases and decreasing the bit rate when the indication of the traffic load of the carrier decreases.

Determining a new bit rate encompasses affecting the bit rate by determining any of the parameters that control the bit rate, including sampling rate and number of quantization bits.

The carrier is a radio carrier, such as an LTE carrier or a 5G radio carrier. The carrier may be a regular carrier, a component carrier in carrier aggregation, CA, a carrier in an unlicensed band in License-assisted access, LAA or a primary or secondary carrier in Dual Connectivity, DC.

In one embodiment, the indication of the traffic load is a power of the carrier. The power of the carrier may be an average power of the carrier. Utilizing average power detection as the indication of the traffic load of the carrier provides a simple but effective method of obtaining an indication of the traffic load since there is a correlation between carrier power and the number of occupied resource blocks, in for example LTE. The average power of the carrier may be the average over at least one subframe of the carrier, particularly for LTE carriers.

In another embodiment, the indication of the traffic load comprises an air-interface bit rate of the carrier, an estimate of occupied resources in a time-frequency grid of the carrier, or an indication of a required quality of resource elements of the carrier. A high fraction of used resources can correspond to either a high or a low bit rate in Mbit/s depending on the modulation order and channel code rate.

Figure 2:
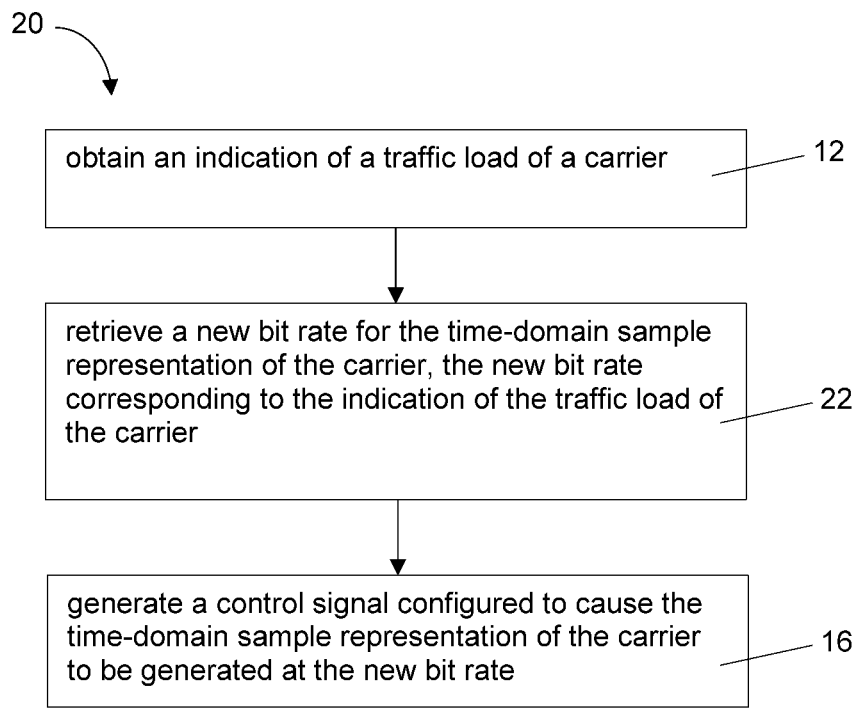
FIG. 2 shows the steps of a method according to an embodiment of the invention of controlling utilization of a fronthaul link in a wireless communication network.

Referring to FIG. 2, another embodiment of the invention provides a method 20 of controlling utilization of a fronthaul link in a wireless communication network. In this embodiment, the new bit rate for the time-domain sample representation of the carrier is determined by retrieving a bit rate corresponding to the indication of the traffic load 22. The new bit rate may be retrieved from a look-up table, for example.

Figure 3:
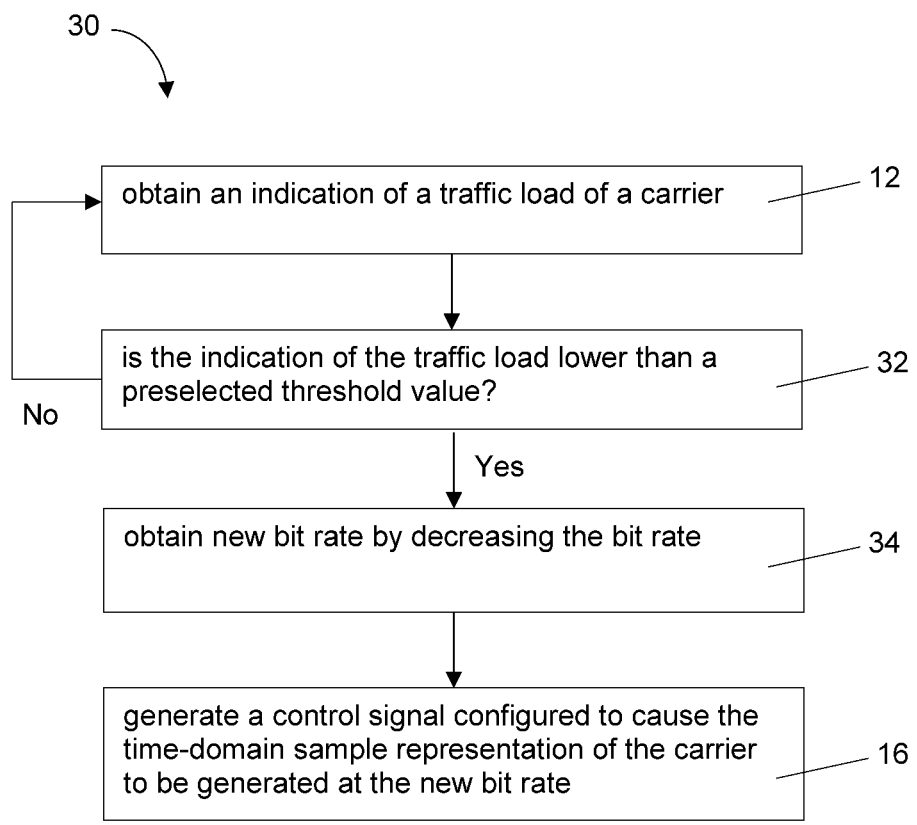
FIG. 3 shows the steps of a method according to an embodiment of the invention of controlling utilization of a fronthaul link in a wireless communication network.

Another embodiment of the invention provides a method 30 of controlling utilization of a fronthaul link in a wireless communication network, as illustrated in FIG. 3. In this embodiment, determining the new bit rate comprises comparing 32 the indication of the traffic load to a preselected threshold value. If the indication of the traffic load is lower than the preselected threshold value, the new bit rate is obtained 34 by decreasing the bit rate.

In one embodiment, the bit rate is decreased by decreasing a number of quantization bits of the time-domain sample representation of the carrier.

In an embodiment, when the indication of the traffic load comprises an estimate of an average fraction of occupied resources in a time-frequency grid of the carrier indicating that all of the resources in the time-frequency grid are occupied, the bit rate is decreased by decreasing a number of quantization bits of the time-domain sample representation of the carrier. If all resources in the time-frequency grid are occupied and the sampling rate is reduced below the Nyquist sampling rate for the carrier, the air interface performance is likely to be degraded. However, the number of quantization bits may be reduced without penalizing the air interface.

In an embodiment, when the indication of the traffic load comprises at least one of an air-interface bit rate of the carrier, a target signal-to-noise ratio, SNR, of the carrier, a modulation format of the carrier and a coding format of the carrier, and does not comprise an estimate of occupied resources in a time-frequency grid of the carrier, the bit rate is decreased by decreasing a number of quantization bits of the time-domain sample representation of the carrier. If the indication of the traffic load of the carrier comprises information about the required quality of resource elements, such as target SNR, modulation and coding format, and air-interface bit rate, it is possible to calculate the minimum required number of quantization bits per sample. In this case, re-quantization is preferred and may be applied for carriers that do not have a frequency domain resource grid, such as Wideband Code Division Multiple Access, WCDMA, carriers.

In further embodiment, the bit rate is decreased by decreasing a sampling rate of the time-domain sample representation of the carrier. The bandwidth of the carrier may also be reduced prior to sampling.

In another embodiment, when the indication of the traffic load comprises an estimate of an average fraction of occupied resources in a time-frequency grid of the carrier indicating that a full bandwidth of the carrier is not used, the bit rate is decreased by decreasing a sampling rate of the time-domain sample representation of the carrier. The sampling rate is maintained above a Nyquist sampling rate of the time-domain sample representation of the carrier. Decreasing the sampling rate under these circumstances may ensure that any signal quality loss for a given bit rate reduction is smaller than for reducing the number of quantization bits, as described above, as long as the sampling rate is above the critical sampling, Nyquist, rate.

In another embodiment, the sampling rate may be temporarily reduced to below the Nyquist sampling rate. Temporary use of a sampling rate below the Nyquist critical sampling rate may be acceptable if there are gaps in the time-frequency grid of the carrier since some radio access technologies may be able to adapt and compact the time-frequency grid until the sampling rate reaches or exceeds the Nyquist sampling rate.

Figure 4:
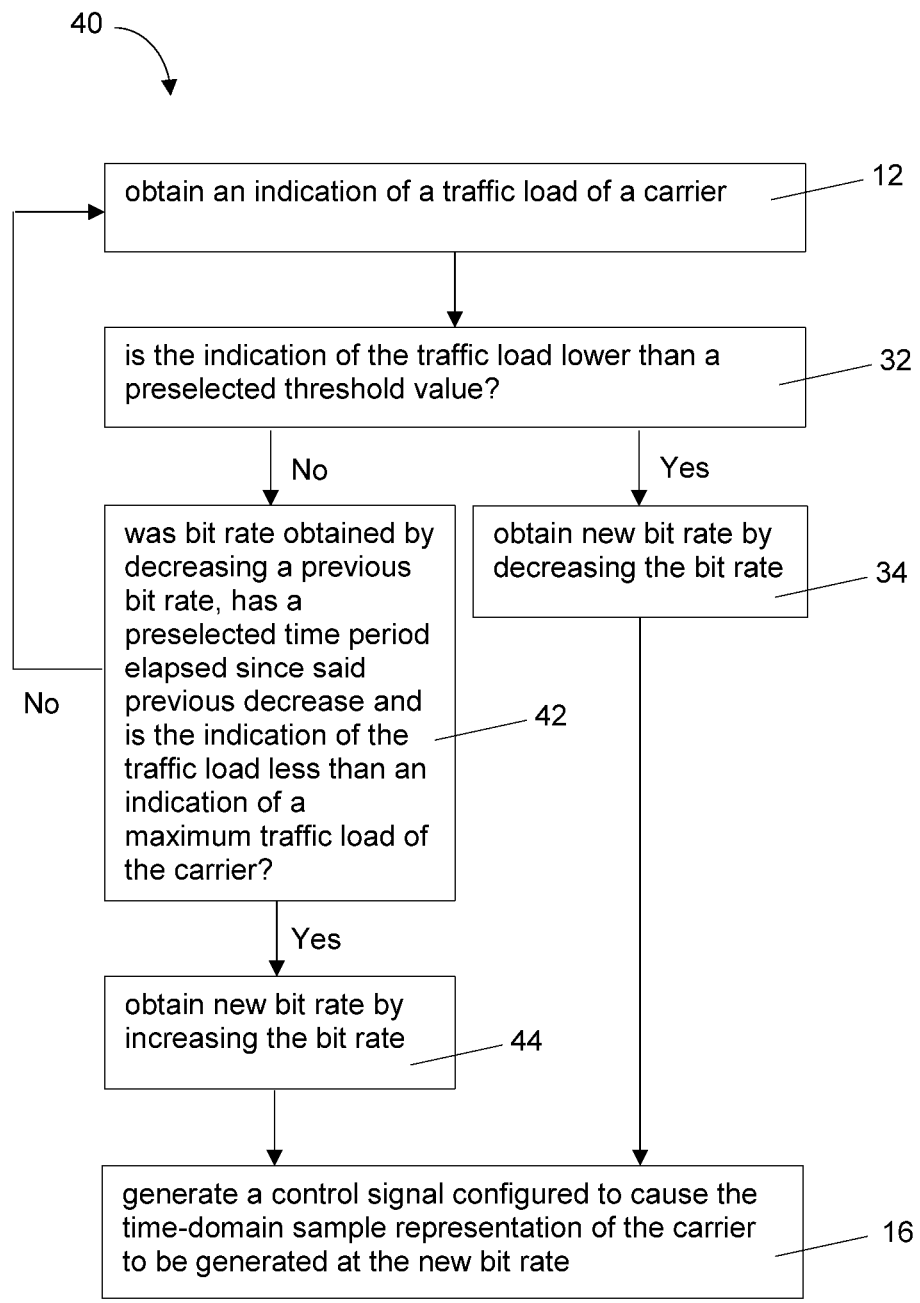
FIG. 4 shows the steps of a method according to an embodiment of the invention of controlling utilization of a fronthaul link in a wireless communication network.

Another embodiment of the invention provides a method 40 of controlling utilization of a fronthaul link in a wireless communication network, as illustrated in FIG. 4. The method of this embodiment is similar to the method of the previous embodiment, with the following performed if, when comparing the indication of the traffic load to a preselected threshold value, the indication of the traffic load is not lower than the preselected threshold value.

The method 40 comprises, if the bit rate was obtained by decreasing a previous bit rate, if a preselected time period has elapsed since said previous decrease, and if the indication of the traffic load is less than an indication of a maximum traffic load of the carrier 42, obtaining 44 the new bit rate by increasing the bit rate.

It may sometimes be difficult to determine whether the indication of the traffic load has gone back above the preselected threshold value or to determine whether the required bit rate is higher than the bit rate currently allowed by the fronthaul link. Increasing the bit rate in this way may ensure that the bit rate does not remain lower than it should be and may ensure that the full traffic capacity of the carrier can be utilized, i.e. that the maximum achievable traffic rate is not capped.

The bit rate may be increased incrementally by a preselected step size until the traffic load is higher than the preselected threshold value. This may ensure that large variations in the bit rate are not produced and that the full traffic capacity of the carrier can be utilized.

In one embodiment, the bit rate is increased by increasing a number of quantization bits of the time-domain sample representation of the carrier.

In one embodiment, when the indication of the traffic load comprises at least one of an air-interface bit rate of the carrier, a target signal-to-noise ratio of the carrier, a modulation format of the carrier and a coding format of the carrier, and does not comprise an estimate of occupied resources in a time-frequency grid of the carrier, the bit rate is decreased by decreasing the number of quantization bits of the time-domain sample representation of the carrier.

In further embodiment, the bit rate is increased by increasing a sampling rate of the time-domain sample representation of the carrier.

In one embodiment, when the indication of the traffic load comprises an estimate of an average fraction of occupied resources in a time-frequency grid of the carrier indicating that a full bandwidth of the carrier is not used, the bit rate is decreased by decreasing the sampling rate of the time-domain sample representation of the carrier.

Figure 5:
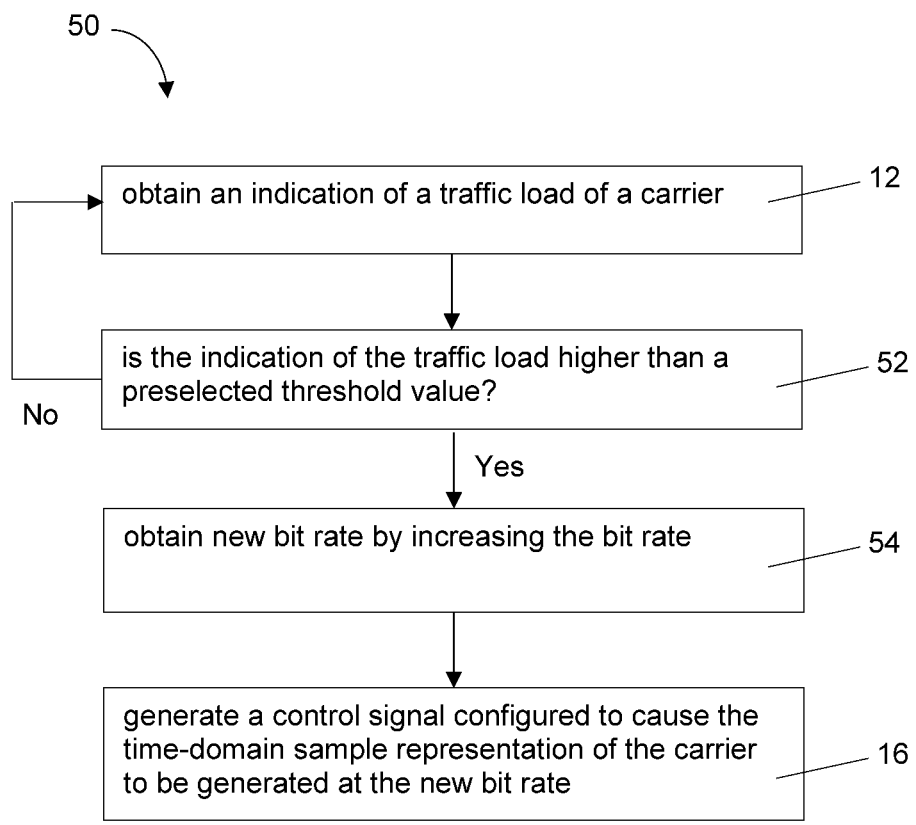
FIG. 5 shows the steps of a method according to an embodiment of the invention of controlling utilization of a fronthaul link in a wireless communication network.

Another embodiment of the invention provides a method 50 of controlling utilization of a fronthaul link in a wireless communication network, as illustrated in FIG. 5. In this embodiment, determining the new bit rate comprises comparing 52 the indication of the traffic load to a preselected threshold value. If the indication of the traffic load is higher than the preselected threshold value, the new bit rate is obtained 54 by increasing the bit rate.

In one embodiment, the bit rate is increased by increasing a number of quantization bits of the time-domain sample representation of the carrier.

In further embodiment, the bit rate is increased by increasing a sampling rate of the time-domain sample representation of the carrier.

In an embodiment, the indication of the traffic load is compared to a first preselected threshold value to determine whether to obtain the new bit rate by decreasing the bit rate and is compared to a second, higher, preselected threshold value to determine whether to obtain the new bit rate by increasing the bit rate.

In some cases, the first and second preselected thresholds, for decreasing and increasing the bit rate, may be close to each other, which could result in very frequent changes of bit rate. This may not be desired, due to the additional overhead needed to inform the other end of the fronthaul link of the changes. The method 40 illustrated in FIG. 4 may be usefully applied to mitigate this problem. If the bit rate was obtained by decreasing a previous bit rate, if a preselected time period has elapsed since said previous decrease, and if the indication of the traffic load is less than an indication of a maximum traffic load of the carrier 42, the method 40 comprises obtaining 44 the new bit rate by increasing the bit rate. Using this time-based approach to increasing the bit rate may prevent the bit rate changing too frequently.

In an embodiment, the preselected threshold value is a preselected amount below an indication of a maximum traffic load of the carrier. The threshold value may be very different for different traffic capacities. Setting the preselected threshold value relative to the maximum traffic load may ensure that the threshold is always related to the traffic capacity.

Figure 6:
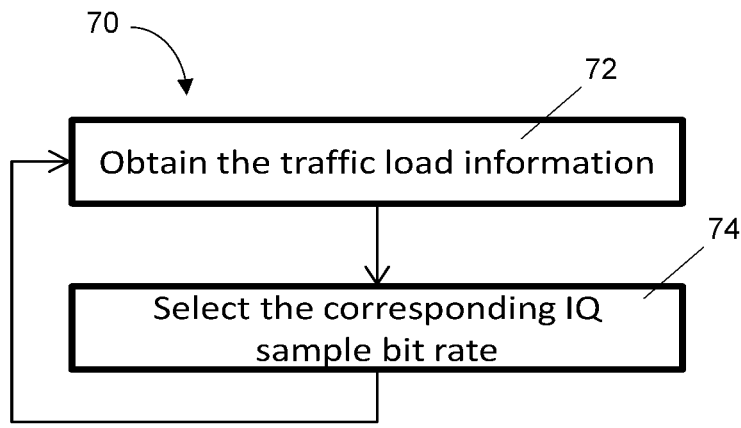
FIG. 6 shows the steps of a method according to an embodiment of the invention of controlling utilization of a fronthaul link in a wireless communication network.

Another embodiment of the invention provides a method 70 of controlling utilization of a fronthaul link in a wireless communication network, as illustrated in FIG. 6.

In this embodiment, the time-domain sample representation of a carrier comprises IQ data samples and the bit rate is an IQ-sample bit rate. The method 70 of this embodiment adapts the IQ-sample bit rate to the traffic load on the sampled carrier. Reducing the number of quantization bits and reducing the sampling rate may both contribute to lower IQ sample bit rate. When there are enough unused resources, it is possible to reduce the IQ-sample bit rate without affecting the end-user bit rate. If the radio link quality drops too much due to the reduced IQ-sample bit rate, radio link adaptation will occur, switching to a more robust modulation and/or channel code. After link adaptation, a larger fraction of the resources needs to be used to transmit the information. If a too large fraction of resource blocks are already occupied, it is not possible to decrease the IQ-sample bit rate further without affecting the end-user bit rate.

When the traffic load decreases, a lower IQ-sample bit rate is used. When the traffic load increases, the IQ-sample bit rate is increased accordingly. A look-up table may be used to map traffic load to IQ-sample bit rate. The look-up table may contain a mix of both reduced quantization bits and reduced sampling rate.

As illustrated in FIG. 6, the method 70 comprises obtaining 72 information about the traffic load of the carrier, i.e. the indication of the traffic load. Once the traffic load has been obtained, the corresponding IQ-sample bit rate is selected 74.

Figure 7:
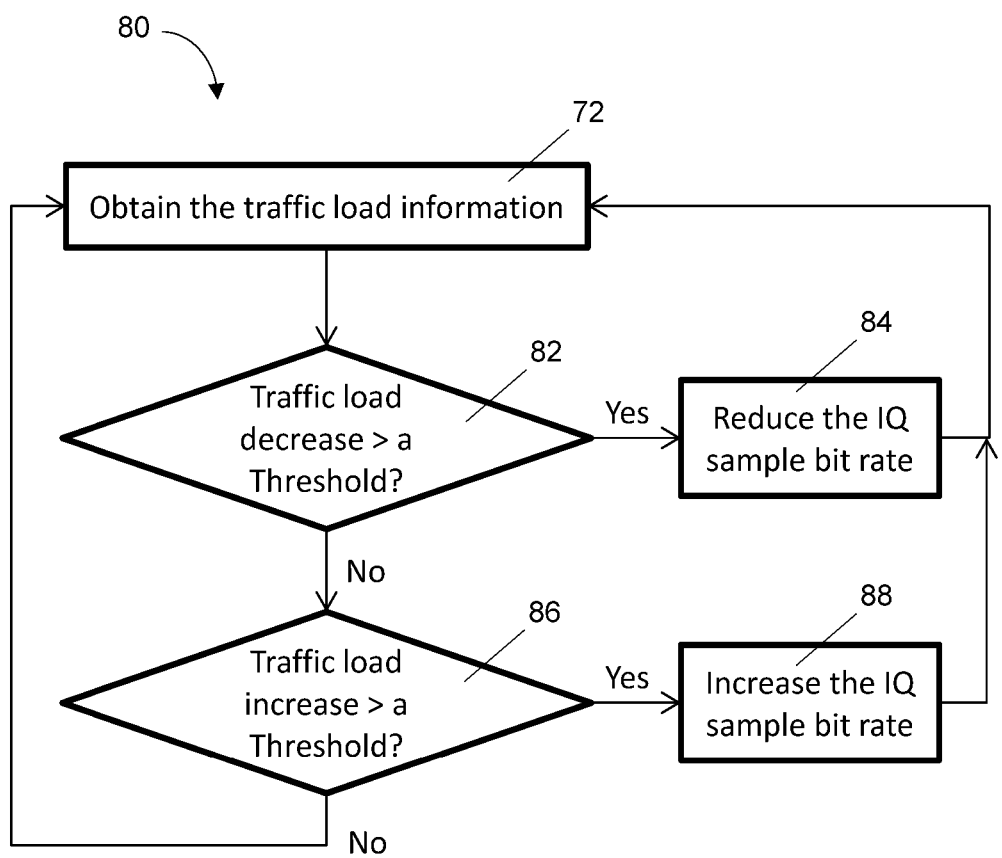
FIG. 7 shows the steps of a method according to an embodiment of the invention of controlling utilization of a fronthaul link in a wireless communication network.

Another embodiment of the invention provides a method 80 of controlling utilization of a fronthaul link in a wireless communication network, as illustrated in FIG. 7.

In this embodiment, the traffic load information for the carrier is first obtained 72. Then the IQ-sample bit rate is reduced 84 if the traffic load is decreased more than a threshold 82. If the traffic load is increased more than a threshold 86, the IQ-sample bit rate is increased 88. There may be several thresholds for determining different levels of bit rate decrease or increase.

If the information about the traffic load of the carrier comprises information about resource occupancy over a time-frequency grid of the carrier, indicating that the full signal bandwidth is not used, it is possible to reduce the IQ-sample bit rate either by reducing the number of quantization bits, which may also be referred to as re-quantization, or by reducing the sampling rate, which may also be referred to as resampling. In this case resampling is preferred since the signal quality loss for a given IQ-sample bit rate reduction is smaller than for re-quantization as long as the sampling rate is above critical sampling, i.e. the Nyquist sampling rate. Even temporary resampling below critical sampling may be acceptable if there are gaps in the time-frequency grid. The reason is that some radio access technologies may be able to adapt and compact the time-frequency grid until critical sampling or oversampling, i.e. a sampling rate higher than the Nyquist sampling rate, is reached. On the other hand, if all resources in the time-frequency grid are occupied and no oversampling is used, resampling will likely degrade air interface performance. However, re-quantization may still be possible without penalizing the air interface.

If the load estimate gives information about the required quality of resource elements, such as target SNR, modulation and coding formats, and air-interface bit rate, it is possible to calculate the minimum required number of quantization bits. With such a load estimate, and no knowledge about the time-frequency grid occupancy, re-quantization is preferred. This would also work for systems like WCDMA that do not have a frequency domain resource grid.

In some cases, the thresholds for decreasing and increasing IQ sample bit rate may come to close to each other, which could result in very frequent changes of IQ sample bit rate. This may not be desired, for example due to the additional overhead needed to inform the other end of the fronthaul link of the changes.

Figure 8:
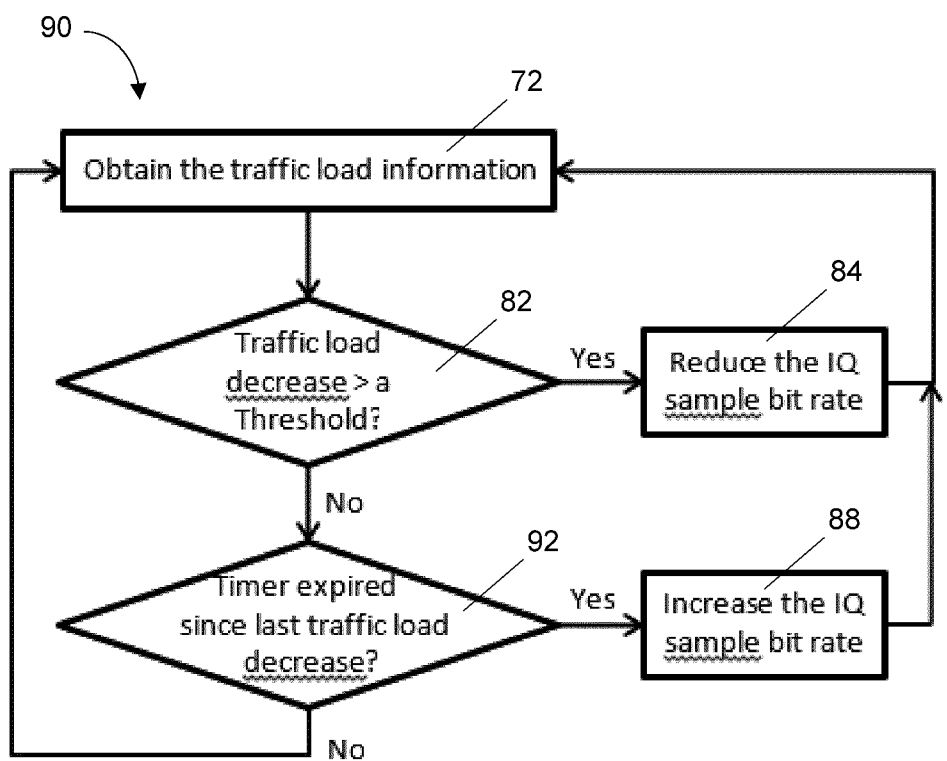
FIG. 8 shows the steps of a method according to an embodiment of the invention of controlling utilization of a fronthaul link in a wireless communication network.

A further embodiment of the invention provides a method 90 of controlling utilization of a fronthaul link in a wireless communication network, as illustrated in FIG. 8, which addresses this situation.

In this embodiment, the IQ-sample bit rate is increased 88 if a certain time has passed since the last traffic load decrease 92.

In a further embodiment, the IQ-sample bit rate is decreased or increased by respectively decreasing or increasing a number of quantization bits of the IQ samples of the carrier.

Low order modulation and low-rate channel coding are more robust than high order modulation and high-rate channel coding, which means that worse channel conditions can be tolerated. This also means that fewer quantization steps, i.e. fewer quantization bits, can be used without sacrificing end-user quality of service. Further, if only a fraction of the carrier bandwidth is used, the dynamic range of the IQ samples decreases. This also allows quantization with fewer bits.

For example, in a downlink, 64 QAM requires X bits for quantization to fulfil the error-vector magnitude, EVM, requirement of the link supporting up to 75 Mbps/antenna, while 16 QAM needs Y bits for supporting up to 50 Mbps/antenna. If the traffic load is below 50 Mbps/antenna, it is then possible to reduce the quantization from X to Y bits, which reduces the fronthaul IQ-sample bit rate by a factor X/Y, while there is no traffic loss. The maximum throughput supported is a function of the number of quantization bits; the higher maximum throughput is needed, the higher the number of quantization bits is required.

A mapping table can be established between the number of quantization bits and the maximum throughput supported; the number of quantization bits can be selected as a function of the traffic load accordingly. With the number of quantization bits and the sampling rate of the IQ samples, the IQ-sample bit rate may be determined.

A mapping table may be obtained by simulations or field tests, which may guarantee the performance for typical traffic profiles. Several tables can also be switched for different traffic profiles.

In a further embodiment, the IQ-sample bit rate is decreased or increased by respectively decreasing or increasing a sampling rate of the IQ samples of the carrier.

According to the Nyquist theory, the sampling rate used to sample a carrier should be more than twice the carrier bandwidth to avoid distortion of the carrier by the sampling process. If only a fraction of the bandwidth is used, it may be possible to reduce the carrier bandwidth, by filtering the carrier, and the sampling rate. For certain radio access technologies, it is only possible to decrease the amount of oversampling since critical pilots and control signals may be spread over the whole carrier bandwidth, while for other radio access technologies, it may be possible to go below critical sampling and suppress parts of the carrier when traffic load is low.

In this embodiment, the IQ-sample bit rate is reduced by first reducing the carrier bandwidth by filtering out signal components, i.e. subcarriers, outside the desired reduced bandwidth, when traffic load is low. The filtered carrier is then sampled at a lower sampling rate. This will force traffic to be loaded onto the unfiltered subcarriers in the remaining bandwidth of the carrier.

The method of this embodiment assumes that traffic scheduling is frequency selective so that no attempt is made to schedule traffic onto resource blocks outside the reduced bandwidth of the carrier. For LTE, the size of the CQI subbands needs to be considered to avoid filtering the edge of a subband so that a high CQI is reported for that subband even though loading traffic there would result in low performance. As one example, for a 20 MHz LTE carrier with 64-QAM, a traffic load of up to 75 Mbps per antenna can be supported. If the bandwidth of the carrier is reduced to its central 10 MHz instead of its original 20 MHz, up to about 42 Mbps can be supported. In this case, the IQ-sample bit rate can be reduced approximately by half compared with a 20 MHz carrier. So if the load gets lower, reducing the bandwidth and resampling is one way to reduce the IQ-sample bit rate and still keep the traffic served. Inside the filtered bandwidth of the carrier, it will still be possible to use high-order modulation, as opposed to the case where the number of quantization bits is changed.

A problem with the method of this embodiment is that reducing the bandwidth of the carrier may filter out embedded common channels like the Physical Downlink Control Channel, PDCCH, so it may not be suitable for an LTE carrier that carries both user plane and control plane. However, there is a trend in the industry to have user plane and control plane separated, such as in future 5G radios. Examples of where control plane and user plane are separated include:

Carrier aggregation: the primary component carrier, PCC, carries both user plane and control plane, while the secondary component carrier, SCC, carries user plane only. In most cases of multi-carrier deployment, all carriers will carry both PCC and SCC. However, when there are not so many users, it can be configured that carrier 1 acts as the PCC for all users and carrier 2 is the SCC. In this case, the resampling method of this embodiment may be applied to the SCC to reduce its IQ-sample bit rate.

License-assisted access, LAA: the carrier in the unlicensed band only carries user plane, therefore the resampling method of this embodiment may be applied to the carrier in the unlicensed band.

Dual connectivity: the carrier to the master base station will carry both user plane and control plane, while the carrier to the slave base station will carry only control plane. If the slave base station is only working with dual connectivity, then method of this embodiment may be applied to its carrier.

5G: the separation of control plane and user plane will be a key feature. For example, for a mixed 4G/5G scenario, the control plane will be carried by LTE while the user plane will be carried by 5G. In this case, the method of this embodiment may be applied to the 5G signal.

Figure 9:
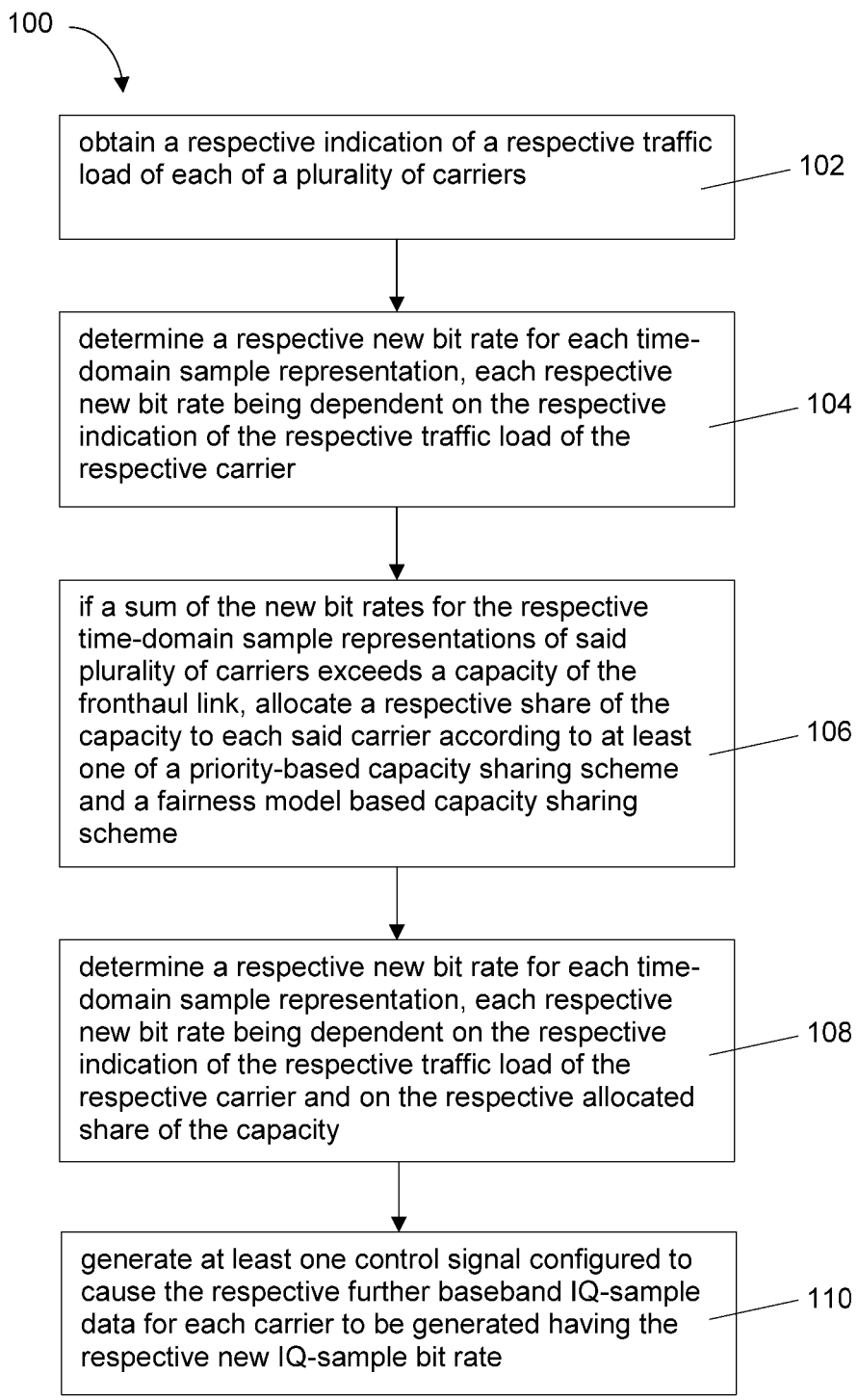
FIG. 9 shows the steps of a method according to an embodiment of the invention of controlling utilization of a fronthaul link in a wireless communication network.

Referring to FIG. 9, another embodiment of the invention provides a method 100 of controlling utilization of a fronthaul link in a wireless communication network. The fronthaul link is configured to transport respective time-domain sample representations of a plurality of carriers each having a respective traffic load. Each time-domain sample representation is generated at a respective bit rate.

The method 100 of this embodiment comprises:
obtaining 102 a respective indication of a respective traffic load of each of said plurality of carriers;
determining 104, 106, 108 a respective new bit rate for each time-domain sample representation, each respective new bit rate being dependent on the respective indication of the respective traffic load of the respective carrier; and
generating 110 at least one control signal configured to cause the respective time-domain sample representation of each carrier to be generated at the respective new bit rate.

If a sum of the new bit rates determined 104 for the respective time-domain sample representations of the plurality of carriers exceeds a capacity of the fronthaul link, a respective share of the capacity is allocated to each said carrier according to at least one of a priority-based capacity sharing scheme and a fairness model based capacity sharing scheme. The respective new bit rate for the respective time-domain sample representation of at least some of said plurality of carriers is additionally dependent on the respective allocated share of the capacity 108.

Capacity is a measure of the maximum amount of data, i.e. traffic, that may be transferred over a link. Capacity is also known as throughput.

The method 100 of this embodiment may therefore control utilization of the capacity of a fronthaul link.

When multiple carriers, especially from multiple network operators, share a fronthaul network, and in particular a fronthaul link, the method 100 of this embodiment provides additional functionality which may enable control of the utilisation of the fronthaul link capacity by each carrier.

The method 100 of this embodiment may be implemented using a fronthaul traffic scheduler configured to apply the fairness model to schedule the traffic of different carriers. The fronthaul traffic scheduler is fronthaul-adaptation aware, which may ensure that the total traffic load would not saturate the fronthaul link capacity. The fronthaul traffic scheduler may also ensure that the carriers share the fronthaul link following the fairness model. When the fronthaul capacity is fully utilized, the fronthaul traffic scheduler shapes the traffic flow of different carriers in a fair manner. This means that samples may have to be dropped if fronthaul link capacity is exceeded.

Alternatively, an IQ-sample bit rate adaptation algorithm with a built-in fairness model may be used to implement the method 100. The algorithm ensures that the total fronthaul capacity is not saturated and also that fair sharing between different carriers is achieved. Here, mechanisms in the radio interface normally intended for air-channel estimation, for example cell-specific reference signals, CRS, and channel quality indication, CQI, estimation in LTE, may be used to form a feedback loop and adapt to the combination of air-channel and fronthaul-compression degradation. This means that the fronthaul traffic scheduler will not try to schedule more traffic over the air than the current capacity of the compressed fronthaul link.

In an embodiment, the method further comprises applying a respective bias to at least one of the traffic load indication and the preselected threshold value for at least some of the plurality of carriers. This may ensure that each said carrier remains within its respective allocated share of the capacity. For example, if a carrier exceeds its allocated share of the capacity, the preselected threshold value for a bit rate decrease can be set to a level above the indication of the traffic load of the carrier in order to force a bit rate decrease.

An interesting observation in the traffic distribution of current mobile networks is that 80% of the traffic is carried in 20% of the antenna sectors. This indicates that there is a statistical utilization of antenna sectors over time which indicates a potential for multiplexing gains increasing the utilization of fronthaul links carrying aggregated data.

For a fixed amount of capacity in a fronthaul network, it is possible to dimension more carriers into a fronthaul link by statistical multiplexing gain, since it is unlikely that all carriers are fully loaded at the same time. This may avoid the traditional over-provisioning in fronthaul capacity. The fronthaul infrastructure can be upgraded gradually as the traffic increases. This would enable a significant CAPEX reduction, especially for the initial deployment phase, and accelerate the 5G network deployment process.

Figure 10:
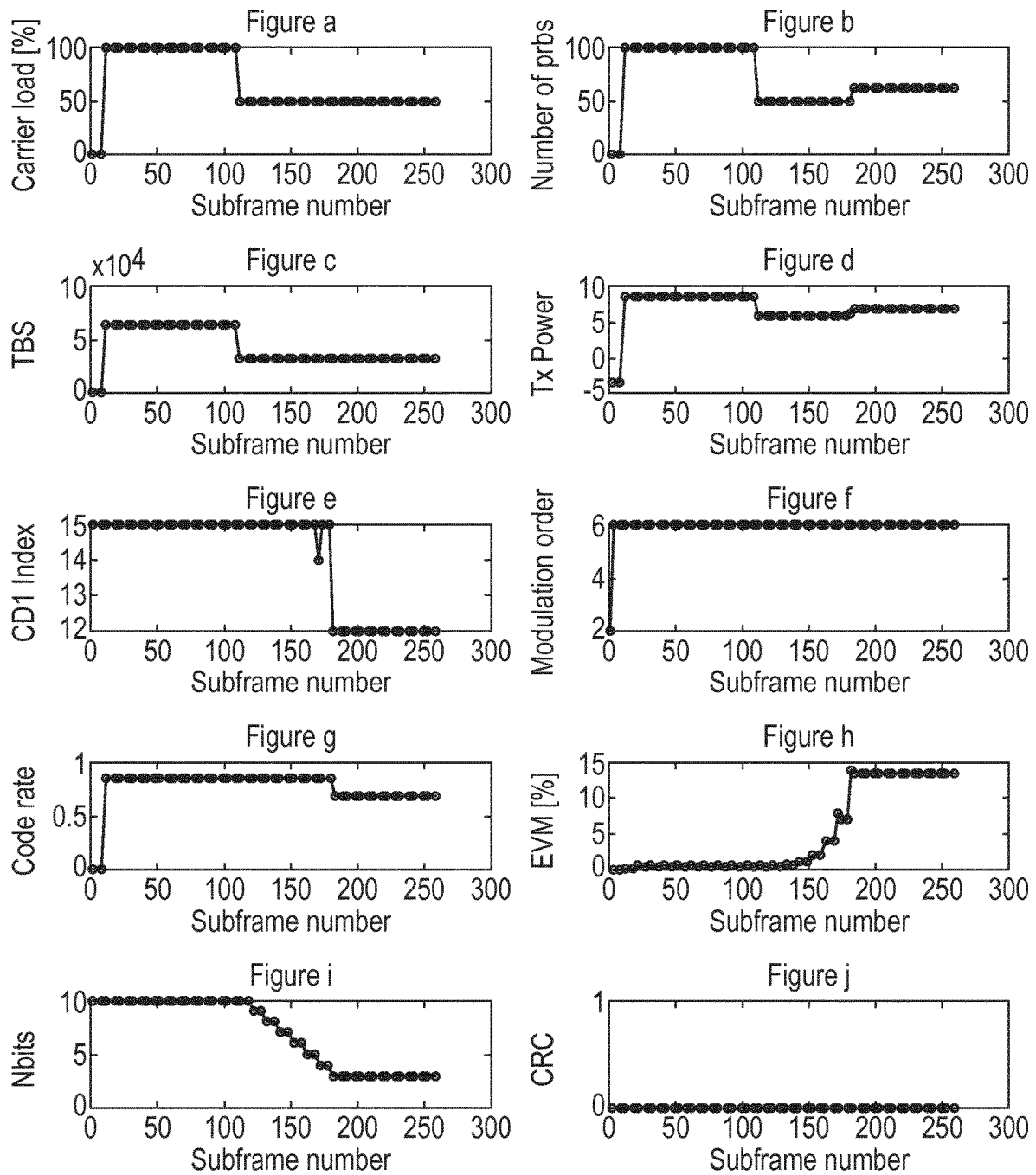
FIG. 10 illustrates a simulation of a method according to an embodiment of the invention of controlling utilization of a fronthaul link in a wireless communication network by adaptive quantization of a 20 MHz LTE carrier with decreasing traffic load.
Figure 11:
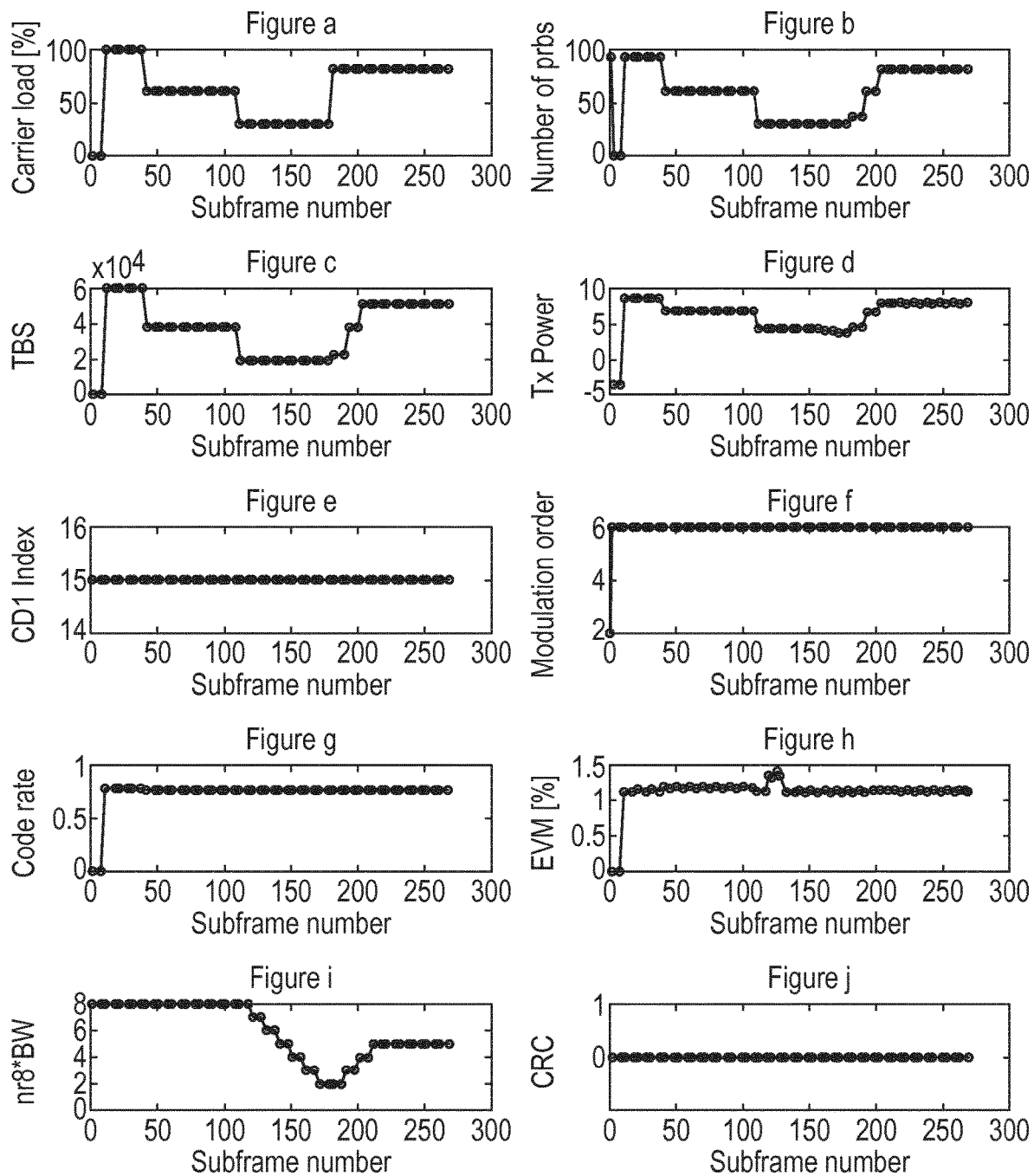
FIG. 11 illustrates a simulation of a method according to an embodiment of the invention of controlling utilization of a fronthaul link in a wireless communication network by adaptive filtering of a 20 MHz LTE carrier with varying traffic load.

Referring to FIGS. 10 and 11, two simulations, average signal power is used as the indication of the traffic load of the carrier, were performed. In both simulations, the traffic load varies over time. In this case, the traffic load is estimated quite well by carrier power detection. In the first simulation, illustrated in FIG. 10, the number of quantization bits is adapted to the indication of the traffic load of the carrier. In the second simulation, illustrated in FIG. 11, the carrier bandwidth and sampling rate are adapted to the indication of the traffic load of the carrier. The results show that the adaptation works very well without causing any packet errors. It indicates even a better adaptation performance can be expected if a more precise indication of the traffic load is known, for example if it is obtained from a BBU connected to the fronthaul link.

FIG. 10 shows a simulation example of how the traffic load of a carrier can be estimated from the carrier power in the time domain and how the number of quantization bits of the IQ-samples can be adjusted according to the carrier power in order to reduce the required fronthaul link capacity. The carrier power is calculated for each radio subframe but the average signal power over 10 subframes (one radio frame) is used as input to the quantization change decision. In a product implementation it is possible that adaptive changes may be made over an even longer time frame to avoid the IQ-sample bit rate rapidly fluctuating up and down for bursty traffic. A drawback with the described method is that downlink modulation and coding changes are based on Channel Quality Information, CQI, reported by a user equipment, UE, receiving the carrier and the CQI is only calculated at a configurable interval and reported back to the BBU at another configurable interval. This means that a reduction in the number of quantization bits might lead to an increase in transport block errors until a CQI taking account of the new IQ-sample bit rate is calculated and reported back to the BBU which then can make a decision to increase the coding and/or reduce the modulation order. Therefore it is recommended to avoid too frequent changes in the number of quantization bits.

In this example the simulation is run with one radio frame with 0% load, followed by 10 radio frames with 100% load, being 100 RB, and then followed by 15 radio frames with 50% load, as seen in FIG. 10a. As can be seen in FIG. 10d the carrier power difference between zero load and full load is about 12 dB. When the traffic load drops to 50% at subframe 110, the carrier power decreases by about 2.7 dB. This drop is above the preselected threshold value, which here has been set to 2 dB below the carrier power at 100% load. Threshold crossing will trigger a decrease in the number of quantization bits for I and Q as shown in FIG. 10i. The number of quantization bits is decreased by 1 bit per radio frame until the carrier power is above the preselected threshold value again.

The signal-to-interference-plus-noise ratio, SINR, is quite high in this example and the number of quantization bits can be decreased quite a lot until a modulation and coding change is triggered by a decreased CQI. At subframe 180 the CQI drops from 15 to 12 and the number of quantization bits is then down to 3 bits. The decreased CQI triggers a lower coding rate, shown in FIG. 10g, so that more resource blocks, shown in FIG. 10b, are needed for the requested transport block size, shown in FIG. 10c. The use of more resource blocks leads to an increase in carrier power which then is 1.7 dB below the signal power for full load which means that the carrier power is above the preselected threshold value and the number of quantization bits is not changed any further. No cyclic redundancy check, CRC, errors have been observed, as shown in FIG. 10j. Even though the EVM is increased, the reduced coding rate maintains reliable transmission without causing any packet error.

Increasing the number of quantization bits when the traffic load increases may be implemented by setting a second preselected threshold value, of for example 0.5 dB below the maximum carrier power. If the carrier power is between the maximum power and the second threshold value it can be considered that the utilization is so high the number of bits needs to be increased. Another possible approach to increase the number of bits is to have a timing based approach. If there is spare capacity in the fronthaul the number of quantization bits can be slowly increased after a set time interval.

FIG. 11 shows a simulation example of how the IQ-sample bit rate can be adapted to the traffic load of a carrier by filtering to reduce the bandwidth of the carrier and reducing the sampling rate. Like the previous, example the traffic load of the carrier is estimated from the average carrier power over 10 subframes and a threshold value is selected to trigger changes in the IQ-sample bit rate. In this simulation the threshold is however not relative to the carrier power for a 100% traffic load since filtering to reduce the bandwidth of the carrier will affect how much power the carrier can have. Instead the threshold value is relative to the maximum power compensated for how much the power is reduced by reducing the bandwidth of the carrier. The threshold value is once again selected to be 2 dB.

This simulation also includes an increase in traffic load so that the carrier filtering needs to be widened, to increase the carrier bandwidth. This is triggered by a second preselected threshold value to trigger a change when the carrier power is between the compensated maximum power and the second preselected threshold value. The second threshold is selected to be 0.5 dB.

The simulation was run with one radio frame with 0 load, followed by 3 radio frames with load, followed by 7 radio frames with 60% load, followed by 7 radio frames with 30% load and finally followed by another 7 radio frames with 60% load, as seen in FIG. 11a. FIG. 11d shows the carrier power and as can be seen this follows the traffic load. When the traffic load drops from 100% to 60% the carrier power drops below the first threshold value, at subframe 40, and a decrease in bandwidth and sampling rate is triggered, as can be seen in FIG. 11i. In this example the bandwidth decrease is implemented in steps of n/8 of the total carrier bandwidth and for 60% load the carrier bandwidth can be decreased to 4/8 of the total carrier bandwidth. With 30% load the carrier bandwidth can be decreased further to 2/8 of the total carrier bandwidth, as shown at subframe 130-190 in FIG. 11i. Finally when the traffic load is increased to 60% again, at subframe 180, the first, upper, threshold value is crossed which triggers an increase in carrier bandwidth which steps up to 4/8 again. So the adaptation impacts mainly on the number of physical resource blocks, PRBs, and the EVM does not change much. No CRC errors were seen, as shown in FIG. 11j.

Figure 12:
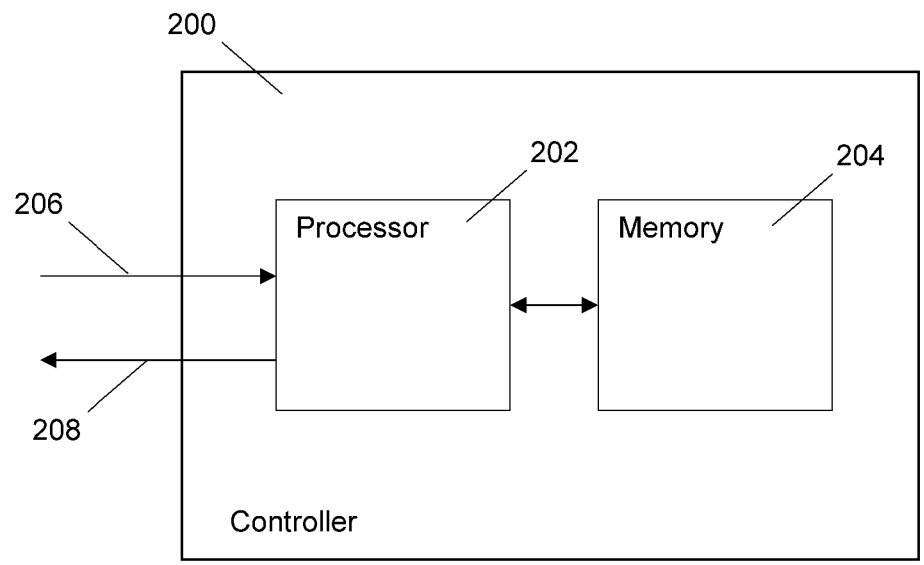
FIG. 12 is a schematic illustration of a controller according to an embodiment of the invention.

Referring to FIG. 12, a further embodiment of the invention provides a controller 200 for a fronthaul link in a wireless communication network. The fronthaul link is configured to transport a time-domain sample representation of a carrier having a traffic load. The time-domain sample representation of the carrier is generated at a sample bit rate.

The controller comprises a processor 202 and a memory 204 containing instructions executable by the processor, whereby the controller is operative to:
obtain an indication 206 of a traffic load of the carrier;
determine a new bit rate for the time-domain sample representation of the carrier, the new bit rate being dependent on the indication of the traffic load of the carrier; and
generate a control signal 208 configured to cause the time-domain sample representation of the carrier to be generated at the new bit rate.

In a further embodiment, the fronthaul link is configured to transport respective time-domain sample representations of a plurality of carriers each having a respective traffic load. Each time-domain sample representation is generated at a respective bit rate.

The memory 204 contains instructions executable by the processor, whereby the controller 200 is operative to:
obtain a respective indication 206 of a respective traffic load of each of said plurality of carriers;
determine a respective new bit rate for each time-domain sample representation, each respective new bit rate being dependent on the respective indication of the respective traffic load of the respective carrier; and
generate at least one control signal 208 configured to cause the respective time-domain sample representation of each carrier to be generated at the respective new bit rate.

If a sum of the new bit rates for the time-domain sample representations of the plurality of carriers exceeds a capacity of the fronthaul link, the memory 204 contains instructions executable by the processor, whereby the controller 200 is operative to allocate a respective share of the capacity to each said carrier according to at least one of a priority-based capacity sharing scheme and a fairness model based capacity sharing scheme memory 204 contains instructions executable by the processor, whereby the controller is operative to determine the respective new bit rate for the respective time-domain sample representation of at least some of said plurality of carriers such that each said respective new bit rate is additionally dependent on the respective allocated share of the capacity.

In an embodiment, the time-domain sample representation of a carrier comprises IQ data samples and the bit rate is an IQ-sample bit rate.

Figure 13:
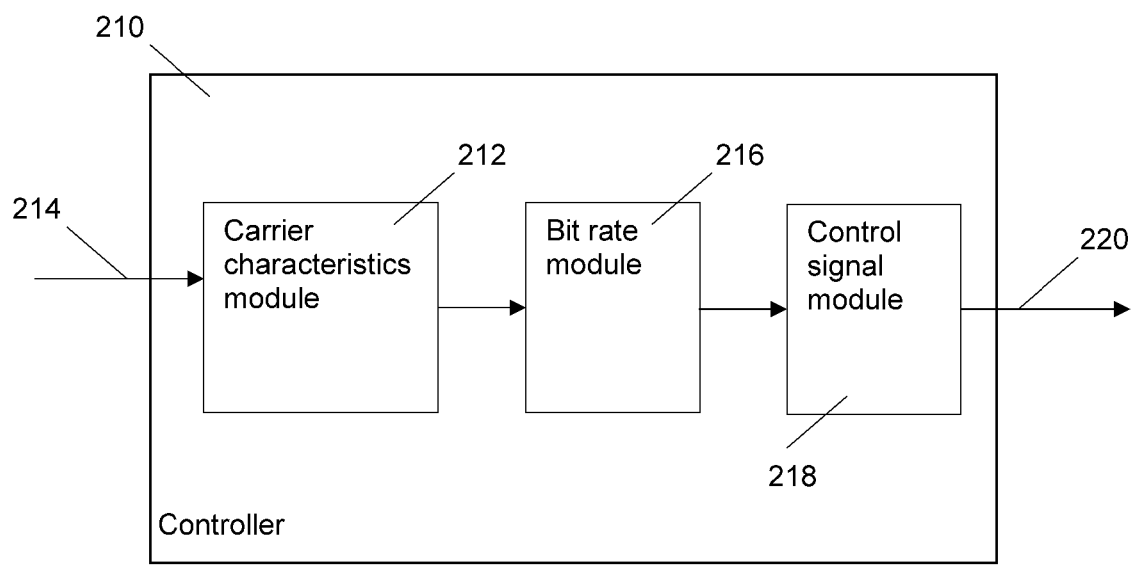
FIG. 13 is a schematic illustration of a controller according to an embodiment of the invention.

Referring to FIG. 13, a further embodiment of the invention provides a controller 210 for a fronthaul link in a wireless communication network. The fronthaul link is configured to transport a time-domain sample representation of a carrier having a traffic load. The time-domain sample representation of the carrier is generated at a sample bit rate.

The controller 210 comprises a carrier characteristics module 212, a bit rate module 216 and a control signal module 218. The carrier characteristics module is for obtaining an indication of a traffic load of the carrier. The bit rate module for determining a new bit rate for the time-domain sample representation of the carrier. The new bit rate is dependent on the indication of the traffic load of the carrier. The control signal module is for generating a control signal 220 configured to cause the time-domain sample representation of the carrier to be generated at the new bit rate.

The modules in at least one embodiment are implemented as a computer program running on a processor.

Figure 14:
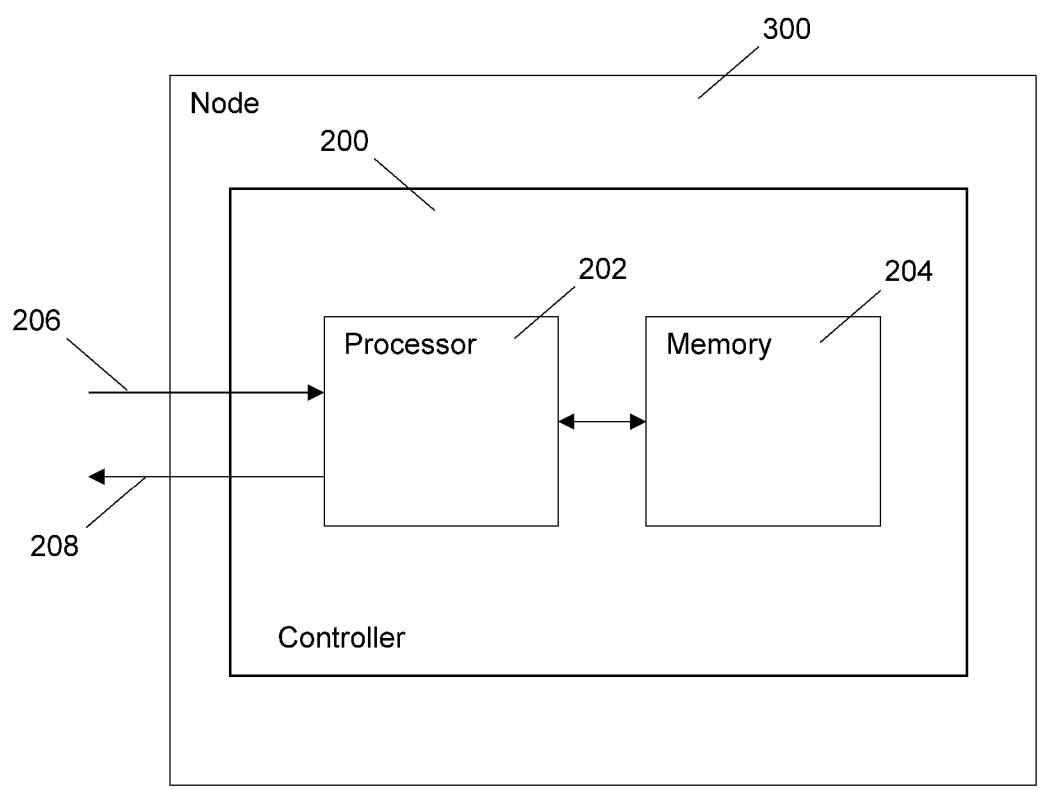
FIG. 14 is a schematic illustration of a communication network node according to an embodiment of the invention.

Referring to FIG. 14, a further embodiment of the invention provides a wireless communication network node 300 for connection to a fronthaul link in a wireless communication network. The fronthaul link is configured to transport a time-domain sample representation of a carrier having a traffic load. The time-domain sample representation of the carrier is generated at a sample bit rate.

The wireless communication network node comprises a controller 200, as described above with reference to FIG. 12.

The wireless communication network node may alternatively comprise a controller 210, as described above with reference to FIG. 13.

A further embodiment of the invention provides a computer program, comprising instructions which, when executed on at least one processor, cause the at least one processor to carry out any of the steps of the method 10, 20, 30, 40, 50, 60, 70, 80, 90, 100 of controlling utilization of a fronthaul link in a wireless communication network of any of the above embodiments.

A further embodiment of the invention provides a carrier containing a computer program, comprising instructions which, when executed on at least one processor, cause the at least one processor to carry out any of the steps of the method 10, 20, 30, 40, 50, 60, 70, 80, 90, 100 of controlling utilization of a fronthaul link in a wireless communication network of any of the above embodiments. The carrier is one of an electronic signal, optical signal, radio signal, or computer readable storage medium.

The invention claimed is:

1. A method of controlling utilization of a fronthaul link in a wireless communication network, the fronthaul link being configured to transport a time-domain sample representation of a carrier having a traffic load, the time-domain sample representation of the carrier being generated at a bit rate, the method comprising:
obtaining an indication of a traffic load of the carrier;
determining a new bit rate for the time-domain sample representation of the carrier, the new bit rate being dependent on the indication of the traffic load of the carrier; and
generating a control signal configured to cause the time-domain sample representation of the carrier to be generated at the new bit rate.

2. The method of claim 1, wherein the determining the new bit rate comprises comparing the indication of the traffic load to a preselected threshold value, and if the indication of the traffic load is lower than the preselected threshold value obtaining the new bit rate by decreasing the bit rate.

3. The method of claim 2, wherein if a) the bit rate was obtained by decreasing a previous bit rate and b) a preselected time period has elapsed since the previous decrease and c) the indication of the traffic load is less than an indication of a maximum traffic load of the carrier, obtaining the new bit rate by increasing the bit rate.

4. The method of claim 2:
wherein the indication of the traffic load is compared to a first preselected threshold value to determine whether to obtain the new bit rate by decreasing the bit rate; and
wherein the indication of the traffic load is compared to a second preselected threshold value, different to the first preselected threshold value, to determine whether to obtain the new bit rate by increasing the bit rate.

5. The method of claim 2, wherein the bit rate is decreased or increased by respectively decreasing or increasing a number of quantization bits of the time-domain sample representation of the carrier.

6. The method of claim 2, wherein the bit rate is decreased or increased by respectively decreasing or increasing a sampling rate of the time-domain sample representation of the carrier.

7. The method of claim 6, further comprising reducing a bandwidth of the carrier.

8. The method of claim 1, wherein the determining the new bit rate comprises comparing the indication of the traffic load to a preselected threshold value, and if the indication of the traffic load is higher than the preselected threshold value obtaining the new bit rate by increasing the bit rate.

9. The method of claim 1, wherein the indication of the traffic load comprises at least one of:
- a power of the carrier;
- an air-interface bit rate of the carrier;
- an estimate of occupied resources in a time-frequency grid of the carrier; and/or
- an indication of a required quality of resource elements of the carrier.

10. The method of claim 1:
wherein the determining the new bit rate comprises comparing the indication of the traffic load to a preselected threshold value, and if the indication of the traffic load is lower than the preselected threshold value obtaining the new bit rate by decreasing the bit rate
wherein the indication of the traffic load comprises at least one of:
- a power of the carrier;
- an air-interface bit rate of the carrier;
- an estimate of occupied resources in a time-frequency grid of the carrier; and/or
- an indication of a required quality of resource elements of the carrier;
wherein, when the indication of the traffic load comprises an estimate of an average fraction of occupied resources in a time-frequency grid of the carrier indicating that a full bandwidth of the carrier is not used, the bit rate is decreased by decreasing a sampling rate of the time-domain sample representation of the carrier.

11. The method of claim 1:
wherein the determining the new bit rate comprises comparing the indication of the traffic load to a preselected threshold value, and if the indication of the traffic load is lower than the preselected threshold value obtaining the new bit rate by decreasing the bit rate
wherein the indication of the traffic load comprises at least one of:
- a power of the carrier;
- an air-interface bit rate of the carrier;
- an estimate of occupied resources in a time-frequency grid of the carrier; and/or
- an indication of a required quality of resource elements of the carrier;
wherein, when the indication of the traffic load comprises at least one of an air-interface bit rate of the carrier, a target signal-to-noise ratio of the carrier, a modulation format of the carrier, and/or a coding format of the carrier, and does not comprise an estimate of occupied resources in a time-frequency grid of the carrier, the bit rate is decreased by decreasing a number of quantization bits of the time-domain sample representation of the carrier.

12. The method of claim 1, wherein the fronthaul link is configured to transport respective time-domain sample representations of a plurality of carriers each having a respective traffic load, each time-domain sample representation being generated at a respective bit rate, and wherein the method comprises:
- obtaining a respective indication of a respective traffic load of each of the plurality of carriers;
- determining a respective new bit rate for each time-domain sample representation, each respective new bit rate being dependent on the respective indication of the respective traffic load of the respective carrier; and
- generating at least one control signal configured to cause the respective time-domain sample representation of each carrier to be generated at the respective new bit rate;
wherein, if a sum of the new bit rates for the respective time-domain sample representations of the plurality of carriers exceeds a capacity of the fronthaul link, a respective share of the capacity is allocated to each the carrier according to at least one of a priority-based capacity sharing scheme and a fairness model based capacity sharing scheme, and the respective new bit rate for the respective time-domain sample representation of at least some of the plurality of carriers is additionally dependent on the respective allocated share of the capacity.

13. The method of claim 1, wherein the time-domain sample representation of the carrier comprises IQ data samples and the bit rate is an IQ-sample bit rate.

14. A controller for a fronthaul link in a wireless communication network, the fronthaul link being configured to transport a time-domain sample representation of a carrier having a traffic load, the time-domain sample representation of the carrier being generated at a sample bit rate, the controller comprising:
- processing circuitry;
- memory containing instructions executable by the processing circuitry whereby the controller is operative to:
  - obtain an indication of a traffic load of the carrier;
  - determine a new bit rate for the time-domain sample representation of the carrier, the new bit rate being dependent on the indication of the traffic load of the carrier; and
  - generate a control signal configured to cause the time-domain sample representation of the carrier to be generated at the new bit rate.

15. The controller of claim 14:
wherein the fronthaul link is configured to transport respective time-domain sample representations of a plurality of carriers each having a respective traffic load, each time-domain sample representation being generated at a respective bit rate;
wherein the instructions are such that the controller is operative to:
- obtain a respective indication of a respective traffic load of each of the plurality of carriers;
- determine a respective new bit rate for each time-domain sample representation, each respective new bit rate being dependent on the respective indication of the respective traffic load of the respective carrier;
- generate at least one control signal configured to cause the respective time-domain sample representation of each carrier to be generated at the respective new bit rate; and
- if a sum of the new bit rates for the time-domain sample representations of the plurality of carriers exceeds a capacity of the fronthaul link:
  - allocate a respective share of the capacity to each the carrier according to at least one of a priority-based capacity sharing scheme and a fairness model based capacity sharing scheme; and determine the respective new bit rate for the respective time-domain sample representation of at least some of the plurality of carriers such that each the respective new bit rate is additionally dependent on the respective allocated share of the capacity.

16. The controller of claim 14, wherein the time-domain sample representation of a carrier comprises IQ data samples and the bit rate is an IQ-sample bit rate.

17. A wireless communication network node for connection to a fronthaul link in a wireless communication network, the fronthaul link being configured to transport a time-domain sample representation of a carrier having a traffic load, the time-domain sample representation of the carrier being generated at a sample bit rate, the wireless communication network node comprising:

a controller comprising processing circuitry and memory containing instructions executable by the processing circuitry whereby the controller is operative to:

obtain an indication of a traffic load of the carrier;

determine a new bit rate for the time-domain sample representation of the carrier, the new bit rate being dependent on the indication of the traffic load of the carrier; and generate a control signal configured to cause the time-domain sample representation of the carrier to be generated at the new bit rate.

18. A non-transitory computer readable recording medium storing a computer program product for controlling utilization of a fronthaul link in a wireless communication network, the fronthaul link being configured to transport a time-domain sample representation of a carrier having a traffic load, the time-domain sample representation of the carrier being generated at a bit rate, the computer program product comprising software instructions which, when run on processing circuitry of a controller for the fronthaul link in the wireless communication network, causes the controller to:

obtain an indication of a traffic load of the carrier;

determine a new bit rate for the time-domain sample representation of the carrier, the new bit rate being dependent on the indication of the traffic load of the carrier; and generate a control signal configured to cause the time-domain sample representation of the carrier to be generated at the new bit rate.

\* \* \* \* \*